United States Patent
Broden et al.

(10) Patent No.: US 6,665,654 B2
(45) Date of Patent: Dec. 16, 2003

(54) CHANGING TABLE RECORDS IN A DATABASE MANAGEMENT SYSTEM

(75) Inventors: Theresa W. Broden, Endwell, NY (US); Robert W. Guse, Endwell, NY (US); Debra A. Parmeter, Castle Creek, NY (US); Jeffrey G. Willets, Apalachin, NY (US)

(73) Assignee: International Business Machines Corporation, Armonk, NY (US)

( * ) Notice: Subject to any disclaimer, the term of this patent is extended or adjusted under 35 U.S.C. 154(b) by 315 days.

(21) Appl. No.: 09/898,661

(22) Filed: Jul. 3, 2001

(65) Prior Publication Data

US 2003/0009436 A1 Jan. 9, 2003

(51) Int. Cl.⁷ ............................ G06F 17/30; G06F 7/00
(52) U.S. Cl. ............................................ 707/1; 707/102
(58) Field of Search ..................................... 707/1, 102

(56) References Cited

U.S. PATENT DOCUMENTS

| | | | |
|---|---|---|---|
| 5,781,911 A | | 7/1998 | Young et al. |
| 5,826,253 A | * | 10/1998 | Bredenberg .................... 707/2 |
| 6,032,158 A | | 2/2000 | Mukhopadhyay et al. |
| 6,151,602 A | * | 11/2000 | Hejlsberg et al. ............. 707/10 |
| 6,167,405 A | | 12/2000 | Rosensteel, Jr. et al. |
| 6,169,985 B1 | | 1/2001 | Almgren et al. |

OTHER PUBLICATIONS

Han–Chieh Wei and Elmasri, R (1999), Study and comparison of schema versioning and database conversion techniques for bi–temporal databases, pp. 88–98.*
Leo Mark and Nick Roussopoulos, (1990), Interoperability of multiple autonomous databases, pp. 267–293.*
Inderpal Singh Mumick, Dallan Qauss, Barinderpal Singh Mumick, (1997), Maintenance of Data cubes and summary tables in a warehouse, pp. 100–111.*

* cited by examiner

*Primary Examiner*—Frantz Coby
*Assistant Examiner*—Cindy Nugyen
(74) *Attorney, Agent, or Firm*—Schmeiser, Olsen & Watts; John R. Pivnichny

(57) ABSTRACT

A method and system for updating and deleting records in a tableset T of a family having M tables ($M \geq 1$). A set S of N source files ($N \geq 1$) are embodied in fileset $S_A$ at time $t_A$ and in fileset $S_B$ at time $t_B$. S is logically associated with T. The family has a common family key $K_F$ across the M tables and across the N source files. A Delta program generates a dataset D having non-redundant family keyvalues embodying $K_F$. Each non-redundant family keyvalue is drawn from selected Update or Delete records of $S_B$ relative to $S_A$. For Updates, a Trigger program generates fileset $\Delta S$ from records of $S_B$ having a family key in D, and a Bridge program generates fileset $\Delta T$ that includes $\Delta S$ data in a form compatible with T. A Load program updates and deletes records in T based on the non-redundant family keyvalues.

62 Claims, 13 Drawing Sheets

FIG. 4

Files $S_{1A}$ and $S_{1B}$ of Example.

File $S_{1A}$ (Purchase Order File At Time $t_A$)

| Purchase Order Number | Purchase Order Date | Purchase Order Point Location | |
|---|---|---|---|
| 256 | 021501 | 23 | |
| 204 | 022301 | 66 | *** |
| 223 | 021701 | 53 | |
| 201 | 021001 | 10 | |
| 247 | 022401 | 38 | |
| 267 | 021601 | 48 | *** |
| 219 | 020501 | 82 | |
| 284 | 021901 | 18 | |
| 255 | 021801 | 77 | |
| 234 | 022001 | 52 | |
| 246 | 021701 | 44 | |

File $S_{1B}$ (Purchase Order File At Time $t_B$)

| Purchase Order Number | Purchase Order Date | Purchase Order Point Location | |
|---|---|---|---|
| 256 | 021501 | 23 | |
| 223 | 021701 | 53 | |
| 201 | 021001 | 11 | * |
| 247 | 022401 | 39 | * |
| 219 | 020501 | 82 | |
| 284 | 021901 | 18 | |
| 255 | 021801 | 77 | |
| 234 | 022101 | 52 | * |
| 246 | 021701 | 44 | |
| 291 | 030401 | 71 | ** |
| 292 | 030401 | 43 | ** |
| 293 | 030501 | 82 | ** |

FIG. 5

Files $S_{2A}$ and $S_{2B}$ of Example

File $S_{2A}$ (Purchase Order -Vendor File At Time $t_a$)

| Purchase Order Number | Vendor Identification | Vendor Region | Vendor Phone Number | |
|---|---|---|---|---|
| 256 | 136 | NE | 213-657-0954 | |
| 204 | 547 | SE | 631-812-0831 | *** |
| 223 | 434 | SW | 453-786-0342 | |
| 201 | 210 | NE | 437-986-3219 | |
| 247 | 306 | NW | 523-865-6712 | |
| 267 | 543 | NE | 241-981-8954 | |
| 219 | 481 | SW | 689-312-6052 | |
| 284 | 302 | SW | 734-804-0510 | |
| 255 | 664 | NW | 196-480-0247 | |
| 234 | 734 | SE | 471-843-7129 | |
| 246 | 790 | NE | 341-906-5698 | |

File $S_{2B}$ (Purchase Order - Vendor File At Time $t_B$)

| Purchase Order Number | Vendor Identification | Vendor Region | Vendor Phone Number | |
|---|---|---|---|---|
| 256 | 136 | NE | 213-657-0954 | |
| 223 | 434 | SW | 453-786-0342 | |
| 201 | 210 | NE | 437-986-3219 | |
| 247 | 306 | NE | 523-865-6712 | * |
| 267 | 543 | NE | 241-981-8954 | |
| 219 | 481 | SW | 689-312-6052 | |
| 284 | 302 | SW | 734-804-0510 | |
| 255 | 664 | NW | 196-480-0247 | |
| 234 | 734 | SW | 471-843-7129 | * |
| 246 | 790 | NE | 341-906-5698 | |
| 291 | 523 | SE | 210-765-2345 | ** |
| 292 | 481 | SW | 689-312-6052 | ** |
| 293 | 545 | NW | 333-444-5555 | ** |

FIG. 6

Files $S_{3A}$ and $S_{3B}$ of Example

File $S_{3A}$ (Purchase Order - Buyer File At Time $t_A$)

| Purchase Order Number | Buyer Identification | Buyer Initials | Buyer Phone Number | |
|---|---|---|---|---|
| 256 | 12 | LGS | 213-432-9065 | |
| 204 | 44 | ITB | 902-153-7003 | *** |
| 223 | 24 | TAS | 432-412-9067 | |
| 201 | 32 | JPN | 132-654-9870 | |
| 247 | 12 | RSC | | |
| 267 | 69 | EWS | 439-921-8401 | *** |
| 219 | 36 | PAB | 336-912-5003 | |
| 284 | 23 | TOV | 532-120-9741 | |
| 255 | 75 | NPW | 552-856-9125 | *** |
| 234 | 51 | CAW | 854-765-1234 | |
| 246 | 32 | SRM | 475-542-0912 | |

File $S_{3B}$ (Purchase Order - Buyer File At Time $t_B$)

| Purchase Order Number | Buyer Identification | Buyer Initials | Buyer Phone Number | |
|---|---|---|---|---|
| 256 | 12 | LGS | 213-432-9066 | * |
| 223 | 24 | TAS | 432-412-9067 | |
| 201 | 32 | JPN | 132-654-9870 | |
| 247 | 13 | RSC | 718-926-8138 | * |
| 219 | 36 | PAB | 336-912-5003 | |
| 284 | 23 | TOV | 532-120-9741 | |
| 234 | 51 | CAW | 854-765-1234 | |
| 246 | 33 | SRN | 475-542-0912 | * |
| 291 | 31 | LSR | 123-902-8877 | ** |
| 292 | 19 | PAF | 537-981-7234 | ** |
| 293 | 88 | TED | 893-327-0560 | ** |

FIG. 8

Result of Compare, Sort, and Select Steps of FIG. 7 for the Update records of the Source Files of FIGS. 4-6.

| 33 ↓ (Compare) | 34 ↓ (Sort) | 35 ↓ (Select) |
|---|---|---|
| 201 | 201 | 201 |
| 247 | 234 | 234 |
| 234 | 234 | 246 |
| 291 | 246 | 247 |
| 292 | 247 | 256 |
| 293 | 247 | 291 |
| 247 | 247 | 292 |
| 234 | 256 | 293 |
| 291 | 291 | |
| 292 | 291 | |
| 293 | 291 | |
| 256 | 292 | |
| 247 | 292 | |
| 246 | 292 | |
| 291 | 293 | |
| 292 | 293 | |
| 293 | 293 | |

Result of Compare, Sort, and Select Steps of FIG. 7 for the Delete records of the Source Files of FIGS. 4-6.

Structure of Each File of the ΔS Fileset

CHANGING TABLE RECORDS IN A DATABASE MANAGEMENT SYSTEM

BACKGROUND OF THE INVENTION

1. Technical Field

The present invention relates to a method and system for updating and deleting records in tables generally in a database management system, and particularly in a business data warehouse, due to changes in source files which are logically associated with the tables.

2. Related Art

Updating and deleting records in a large table in a business data warehouse can be prohibitively time consuming. Thus, there is a need for a method and system for efficiently updating and deleting records in a large table in a business data warehouse.

SUMMARY OF THE INVENTION

The present invention provides a system for updating a tableset T of a family, in relation to N source files denoted as $S_1, S_2, \ldots, S_N$, said N at least 1, said tableset T having M tables $T_1, T_2, \ldots, T_M$, said M at least 1, said N source files logically associated with said M tables, said family having a common family key $K_F$ across the M tables and across the N source files, a fileset $S_A$ comprising files $S_{1A}, S_{2A}, \ldots, S_{NA}$ respectively embodying $S_1, S_2, \ldots, S_N$ at a time $t_A$ such that $T_1, T_2, \ldots, T_M$ at the time $t_A$ accurately reflects $S_A$, and a fileset $S_B$ comprising files $S_{1B}, S_{2B}, \ldots, S_{NB}$ respectively embodying $S_1, S_2, \ldots, S_N$ at a time $t_B$, said $t_B$ and $t_A$ being different times, the system comprises:

a Delta program adapted to generate a dataset D of non-redundant family keyvalues embodying $K_F$, each said non-redundant family keyvalue drawn from selected Update records of $S_{iB}$ relative to $S_{iA}$, said selected Update records not having any redundant family keyvalues, for $i=1, 2, \ldots, N$;

a Trigger program adapted, for $i=1, 2, \ldots, N$: to step through all records of $S_{iB}$, including to compare the family keyvalue $K_{FVR}$ within each record of $S_{iB}$ against the family keyvalues in the dataset D and to save in a file $\Delta S_i$ each said record of $S_{iB}$ for which $K_{FVR}$ equals one of the family keyvalues $K_{FV}$ in the dataset D;

a Bridge program adapted to generate files $\Delta T_1, \Delta T_2, \ldots, \Delta T_M$ that includes the data in $\Delta S_1, \Delta S_2, \ldots, \Delta S_N$ in a form that is compatible with the M tables $T_1, T_2, \ldots, T_M$, respectively; and at least one Load program adapted to update the tables $T_1, T_2, \ldots, T_M$ with the data in $\Delta T_1, \Delta T_2, \ldots, \Delta T_M$, respectively.

The present invention provides a method for updating a tableset T of a family, in relation to N source files denoted as $S_1, S_2, \ldots, S_N$, said N at least 1, said tableset T having M tables $T_1, T_2, \ldots, T_M$, said M at least 1, said N source files logically associated with said M tables, said family having a common family key $K_F$ across the M tables and across the N source files, a fileset $S_A$ comprising files $S_{1A}, S_{2A}, \ldots, S_{NA}$ respectively embodying $S_1, S_2, \ldots, S_N$ at a time $t_A$ such that $T_1, T_2, \ldots, T_M$ at the time $t_A$ accurately reflects $S_A$, and a fileset $S_B$ comprising files $S_{1B}, S_{2B}, \ldots, S_{NB}$ respectively embodying $S_1, S_2, \ldots, S_N$ at a time $t_B$, said $t_B$ and $t_A$ being different times, the method comprises:

executing a Delta program, including generating a dataset D of non-redundant family keyvalues embodying $K_F$, each said non-redundant family keyvalue drawn from selected Update records of $S_{iB}$ relative to $S_{iA}$, said selected Update records not having any redundant family keyvalues, for $i=1, 2, \ldots, N$;

executing a Trigger program, including for $i=1, 2, \ldots, N$: stepping through all records of $S_{iB}$, including comparing the family keyvalue $K_{FVR}$ within each record of $S_{iB}$ against the family keyvalues in the dataset D and saving in a file $\Delta S_i$ each said record of $S_{iB}$ for which $K_{FVR}$ equals one of the family keyvalues $K_{FV}$ in the dataset D;

executing a Bridge program, including generating files $\Delta T_1, \Delta T_2, \ldots, \Delta T_M$ that includes the data in $\Delta S_1, \Delta S_2, \ldots, \Delta S_N$ in a form that is compatible with the M tables $T_1, T_2, \ldots, T_M$, respectively; and executing at least one Load program, including updating the tables $T_1, T_2, \ldots, T_M$ with the data in $\Delta T_1, \Delta T_2, \ldots, \Delta T_M$, respectively.

The present invention provides a system for deleting deletion-targeted records in a tableset T of a family, in relation to N source files denoted as $S_1, S_2, \ldots, S_N$, said N at least 1, said tableset T having M tables $T_1, T_2, \ldots, T_M$, said M at least 1, said N source files logically associated with said M tables, said family having a common family key $K_F$ across the M tables and across the N source files, a fileset $S_A$ comprising files $S_{1A}, S_{2A}, \ldots, S_{NA}$ respectively embodying $S_1, S_2, \ldots, S_N$ at a time $t_A$ such that $T_1, T_2, \ldots, T_M$ at the time $t_A$ accurately reflects $S_A$, and a fileset $S_B$ comprising files $S_{1B}, S_{2B}, \ldots, S_{NB}$ respectively embodying $S_1, S_2, \ldots, S_N$ at a time $t_B$, said $t_B$ and $t_A$ being different times, the system comprises:

a Delta program adapted to generate a dataset $D_{DEL}$ of non-redundant family keyvalues embodying $K_F$, each said non-redundant family keyvalue drawn from selected Delete records of $S_{iB}$ relative to $S_{iA}$, said selected Delete records not having any redundant family keyvalues, for $i=1,2, \ldots, N$; and at least one Load program adapted to delete the deletion-targeted records in the tables $T_1, T_2, \ldots, T_M$, each said deletion-targeted record having one of the non-redundant family keyvalues that exists in the dataset $D_{DEL}$.

The present invention provides a method for deleting deletion-targeted records in a tableset T of a family, in relation to N source files denoted as $S_1, S_2, \ldots, S_N$, said N at least 1, said tableset T having M tables $T_1, T_2, \ldots, T_M$, said M at least 1, said N source files logically associated with said M tables, said family having a common family key $K_F$ across the M tables and across the N source files, a fileset $S_A$ comprising files $S_{1A}, S_{2A}, \ldots, S_{NA}$ respectively embodying $S_1, S_2, \ldots, S_N$ at a time $t_A$ such that $T_1, T_2, \ldots, T_M$ at the time $t_A$ accurately reflects $S_A$, and a fileset $S_B$ comprising files $S_{1B}, S_{2B}, \ldots, S_{NB}$ respectively embodying $S_1, S_2, \ldots, S_N$ at a time $t_B$, said $t_B$ and $t_A$ being different times, the method comprises:

executing a Delta program, including generating a dataset $D_{DEL}$ of non-redundant family keyvalues embodying $K_F$, each said non-redundant family keyvalue drawn from selected Delete records of $S_{iB}$ relative to $S_{iA}$, said selected Delete records not having any redundant family keyvalues, for $i=1, 2, \ldots, N$; and executing at least one Load program, including deleting the deletion-targeted records in the tables $T_1, T_2, \ldots, T_M$, each said deletion-targeted record having one of the non-redundant family keyvalues that exists in the dataset $D_{DEL}$.

The present invention provides a method and associated system for efficiently updating and deleting records in a large table in a database of a database management system (DBMS) such as in a business data warehouse of a DBMS.

BRIEF DESCRIPTION OF THE DRAWINGS

FIG. 4 depicts an example of source files $S_{1A}$ and $S_{1B}$ of filesets $S_A$ and $S_B$, respectively, of FIG. 3, in accordance with embodiments of the present invention.

FIG. 5 depicts an example of a source files $S_{2A}$ and $S_{2B}$ of filesets $S_A$ and $S_B$, respectively, of FIG. 3, in accordance with embodiments of the present invention.

FIG. 6 depicts an example of source files $S_{3A}$ and $S_{3B}$ of filesets $S_A$ and $S_B$, respectively, of FIG. 3, with indicated Update records and Delete records, in accordance with embodiments of the present invention.

FIG. 8 depicts the result of applying the embodiment of the Delta program shown in FIG. 7 for Update records of the source files $S_{1A}$, $S_{1B}$, $S_{2A}$, $S_{2B}$, $S_{3A}$, and $S_{3B}$ depicted in FIGS. 4–6, in accordance with embodiments of the present invention.

DETAILED DESCRIPTION OF THE INVENTION

Figure 1:
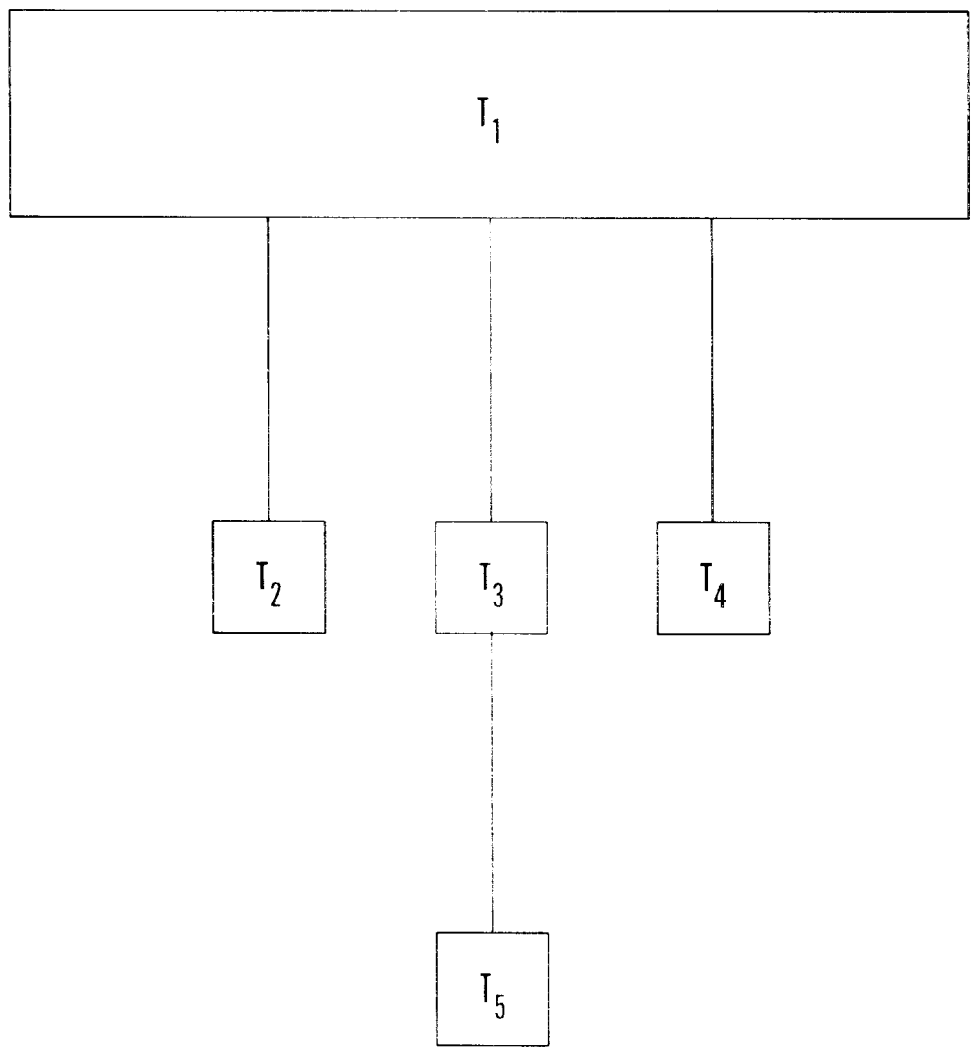
FIG. 1 depicts a family of 5 tables, in accordance with embodiments of the present invention.

FIG. 1 depicts a family of 5 tables denoted individually as $T_1$, $T_2$, $T_3$, $T_4$, and $T_5$, and collectively as a tableset T, in accordance with embodiments of the present invention. The tableset T exemplifies a set of tables that may exist in a business data warehouse, or more generally in a database management system such as DB2, ORACLE, etc. A table is generally a two-dimensional data structure characterized by rows and columns, or records and fields, respectively. The terms "row" and "record" are considered herein to have the same meaning. The terms "column" and "field" are likewise considered herein to have the same meaning. Rows and columns are each one-dimensional arrays.

Each table is characterized by a primary key, namely one or more columns (or fields) that make each record of the table unique. The tables $T_1$, $T_2$, $T_3$, $T_4$, and $T_5$ are grouped together as a "family" because the primary key of each table comprises a common key component called a "family key" $K_F$. For example, if the tableset T comprises data relating to invoices, then the tables $T_1$, $T_2$, $T_3$, $T_4$, and $T_5$ may have a family key consisting of an Invoice Number, and thus each of $T_1$, $T_2$, $T_3$, $T_4$, and $T_5$ would include an Invoice Number column (or field).

Each of tables $T_1$, $T_2$, $T_3$, $T_4$, and $T_5$ is a "family member" of the family. FIG. 1 shows the 5 tables in a family arrangement that is hierarchical, with $T_1$ as a parent, $T_2$, $T_3$, and $T_4$ each a child of $T_1$, and $T_5$ a child of $T_3$ or a grandchild of $T_1$. The hierarchy of the family is governed by hierarchical relationship of the primary keys of the family members. As the parent, $T_1$ may have the family key $K_F$ as its primary key, while $T_2$, $T_3$, $T_4$, and $T_5$ may have primary keys represented symbolically as $\{K_F, K_2\}$, $\{K_F, K_3\}$, $\{K_F, K_4\}$, and $\{K_F, K_3, K_5\}$, respectively. For the present invention, the only key of interest is the family key $K_F$. The scope of the present invention includes the special case in which the family members are in a parallel arrangement with each having the same primary key, namely the family key $K_F$. The family members in such a parallel arrangement may be thought of as brothers and sisters.

Figure 2:
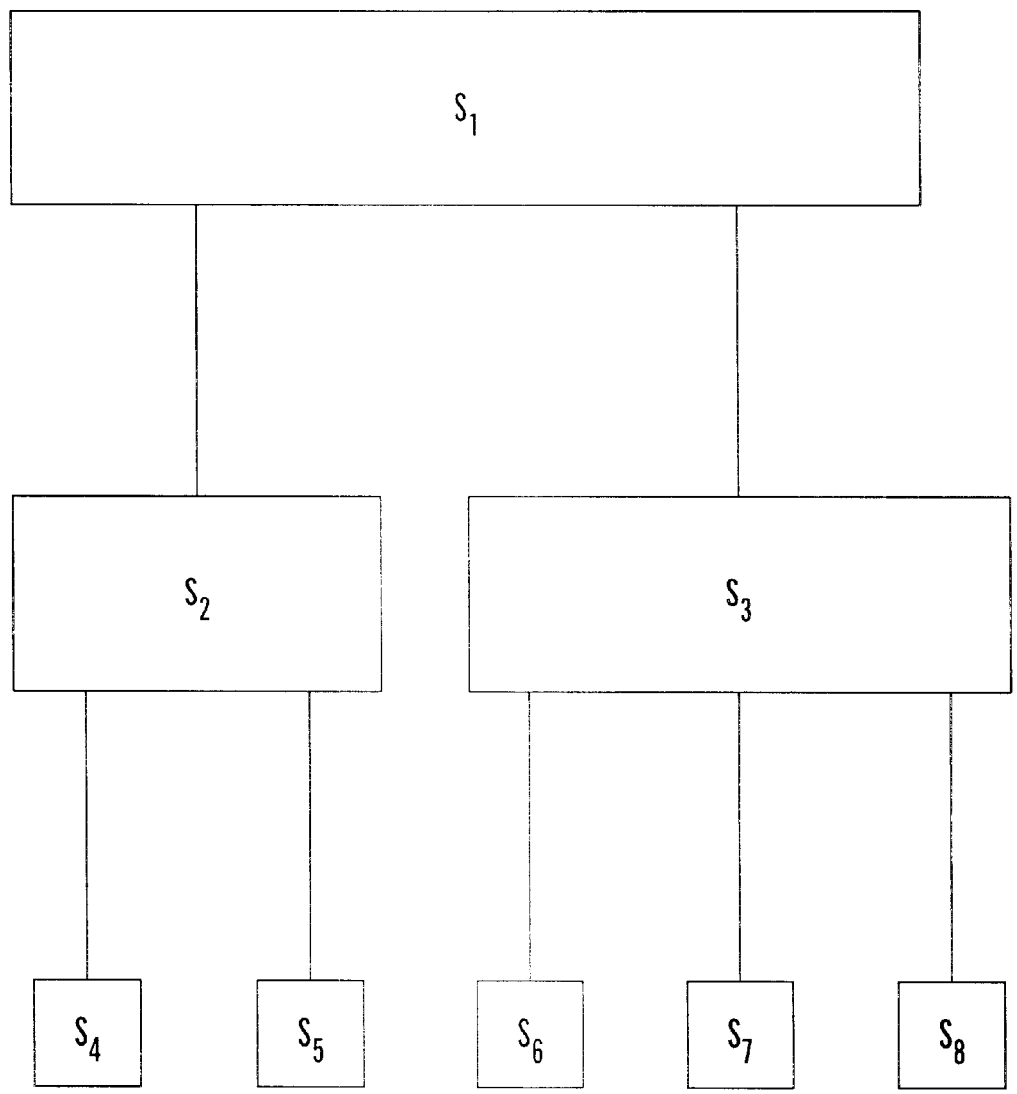
FIG. 2 depicts 8 source files logically associated with the 5 tables of FIG. 1 with a common family key across the 5 tables and 8 source files, in accordance with embodiments of the present invention.

The present invention comprises an efficient method and system for updating and deleting data in the tables of a family based on data in source files that are logically associated with the tables. To illustrate, FIG. 2 depicts a fileset S of 8 source files logically associated with the 5 tables of FIG. 1. The 8 source files of FIG. 2 each comprise records, each record having the same family key $K_F$ as the 5 tables of FIG. 1. The source files may each have its records organized into a table structure with each record being organized identically, such that each record has the same number of fields and the fields are located in the same byte locations in each record. Alternatively, the source files may have a more complex structure. While each record must include the family key $K_F$ in an identifiable portion of the record, it is not required that $K_F$ be located in corresponding bytes or fields along the length of each record. For example, the records of a source file may be structured such that the first 16 bytes of each record include an identification of the byte positions that include the family key. In the latter example, each record of the source file may include the family key in different byte positions within the record. Additionally, the records of the source file may be of either fixed length or of variable length.

The fileset S of source files and the associated tableset T of tables are related in several ways which include the following ways. A first way that S and T are related is that the fileset S and tableset T have the same family key $K_F$ as discussed supra. Accordingly, the family is said to have a common family key, namely $K_F$, across the tables of T and the source files of S. A second way that S and T are related is that the source files of S collectively include data that could be used to generate records in the tables of T. Accordingly, the source files of S are said to be logically associated with the tables of T such that data in the records of the source files of S could be transferred into records of the tables of T. It is not required that the logical association between S and T be simple. An example of such a logical association between S and T in FIGS. 1–2 is: $S_1$ is associated with $T_1$; $S_2$, $S_4$, and $S_5$ are collectively associated with $T_2$; $S_6$ and a portion of $S_3$ are respectively associated with $T_5$ and $T_3$; and $S_7$, $S_8$, and a remaining portion of $S_3$ are collectively associated with $T_4$. Another example of such a logical association between S and T in FIGS. 1–2 is that a portion of each of files $S_1$, $S_2$, ..., $S_8$ includes data that logically belongs in each of tables $T_1$, $T_2$, ..., $T_8$. The scope of the present invention includes any logical association between S and T such that one of ordinary skill in the art could map data of S into records of the tables of T.

The present invention addresses the issue of how to update and delete records in the tableset T to reflect changes in the fileset S. In practice, both the tables of T and the files of S may be very large. Additionally, there be many such filesets S distributed in many locations, such as around the globe, that are changed frequently (e.g., daily). Such frequent changes in many large filesets is very time consuming using existing software for current database management systems, because the current database management systems do not implement changes to database tables efficiently. The present invention comprises a novel and efficient way of extracting data changes in S for subsequent insertion of the data changes into T by updating and deleting records of T, and further comprises a novel way of loading records (or of deleting records) associated with said extracted data changes into T, as discussed next. The following discussion presents an overview of the present invention with reference to FIG. 3.

Figure 3:
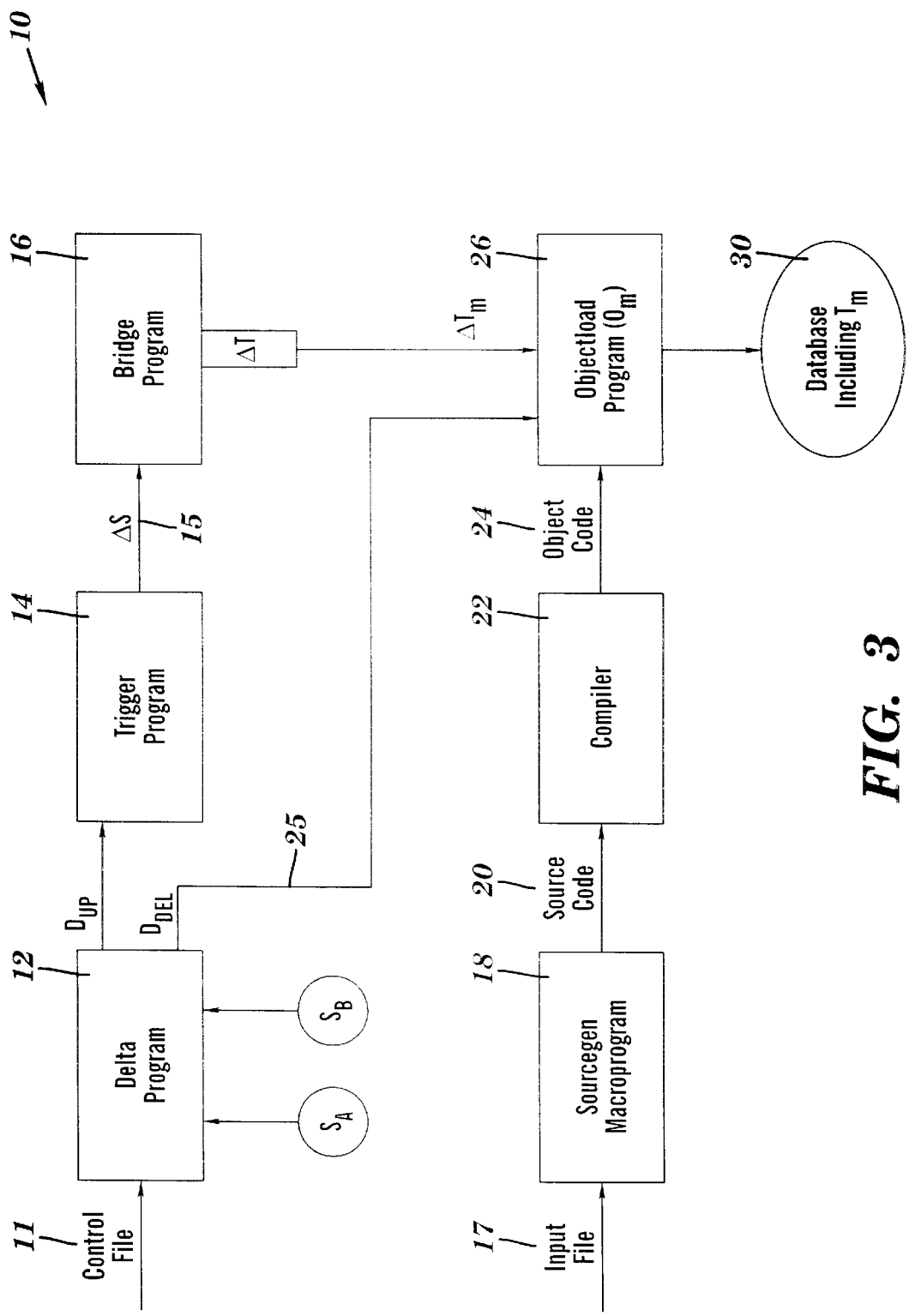
FIG. 3 is a block diagram of a system for updating and deleting records a family of tables based on differences between source filesets $S_A$ and $S_B$ at times $t_A$ and $t_B$, respectively, said system adapted to execute programs including a Delta program, a Trigger Program, a Bridge program, a Sourcegen macroprogram, and an Objectload program, in accordance with embodiments of the present invention.

FIG. 3 is a block diagram of a system 10 for updating and deleting records in a tableset T of a family of tables $T_1$, $T_2$, ..., $T_M$ (M≧1) based on updated or deleted data in N source files $S_1$, $S_2$, ..., $S_N$, (N≧1), in accordance with embodiments of the present invention. The family has a common family key $K_F$ across the M tables and across the N source files. A fileset $S_A$ comprising files $S_{1A}$, $S_{2A}$, ..., $S_{NA}$ respectively embodies $S_1$, $S_2$, ..., $S_N$ at a time $t_A$ such that $T_1$, $T_2$, ..., $T_M$ at time $t_A$ accurately reflects $S_A$; i.e., at the time $t_A$, the data in $T_1$, $T_2$, ..., $T_M$ is up-to-date and thus consistent with the data in $S_1$, $S_2$, ..., $S_N$. Additionally, a fileset $S_B$ comprising files $S_{1B}$, $S_{2B}$, ..., $S_{NB}$ respectively embodies $S_1$, $S_2$, ..., $S_N$ at a time $t_B$, said $t_B$ and $t_A$ being different times. FIG. 3 illustrates the system and method of the present invention for updating T to reflect the data in S at the time $t_B$. Although $t_B$ is typically later than $t_A$, the scope of the present invention includes the situation in which $t_B$ is earlier than $t_A$. For example, T may have been erroneously updated from an earlier time to a later time, and now such erroneous updating needs to be reversed necessitating updating the database from the later time to the earlier time in order to restore the database to its state that existed at the earlier time.

The present invention considers two types of "Changes" in the source files $S_1$, $S_2$, ..., $S_N$ and associates tables $T_1$, $T_2$, ..., $T_M$, namely "Updates" and "Deletes." An "Update" may be either a "Modify" Update (change in data of one or more fields of a record) or an "Add" Update (addition of a new record of data). A "Delete" pertains to deletion of an entire record of data. Definitionally, a "Change" in a source file is either an "Update" or a "Delete", and a Change record is either an Update record or a Delete record.

The system 10 in FIG. 3 uses a Delta program 12 (for both Update and Delete changes) and a Trigger program 14 (for Update changes only) in sequence, to generate a fileset ΔS comprising files $\Delta S_1$, $\Delta S_2$, ..., $\Delta S_N$ which respectively include records of $S_{1B}$, $S_{2B}$, ..., $S_{NB}$ that have data not included in the tableset T at time $t_A$. Next for Update changes, a Bridge program 16 accepts $\Delta S_1$, $\Delta S_2$, ..., $\Delta S_N$ as input and generates a fileset ΔT (i.e., $\Delta T_1$, $\Delta T_2$, ..., $\Delta T_M$) as output. ΔT includes the data in ΔS, and ΔT is in a form that is compatible with the M tables of the tableset T. The files $\Delta T_1$, $\Delta T_2$, ..., $\Delta T_M$ include data for respectively updating the tables $T_1$, $T_2$, ..., $T_M$. The Bridge program 16 receives ΔS from the Trigger program 14 over a data path 15. The Bridge program 16 transforms ΔS to ΔT by accounting for the logical association between S and T, discussed supra, and also by reconciling differences in data format between S and T (e.g., reconciling differences in the number of bytes allocated for storing data, converting from integer representations to character representations of the same data, packing distributed data into one data word or vice versa, reducing the number of significant figures in a floating point number, etc.). FIG. 3 also shows a data path 25 for transmission of a dataset $D_{DEL}$ (to be described infra) from the Delta Program 12 to the Objectload Program 26.

Given ΔT (i.e., $\Delta T_1$, $\Delta T_2$, ..., $\Delta T_M$) as output from the Bridge program 16, the present invention uses each $\Delta T_m$ to update the table $T_m$, for m=1, 2, ..., M. The updating of $T_m$ in its database 30 is accomplished by an Objectload program ($O_m$) 26, which is an object-level program. As shown in FIG. 3, the Objectload program ($O_m$) 26 is dynamically generated by utilizing a Sourcegen macroprogram 18 to generate source code 20 that is compiled by a compiler 22 into object code 24 that serves as the Objectload program ($O_m$) 26.

In an embodiment of the present invention, the Bridge program 16, the Objectload program 26 (as well as the associated Sourcegen macroprogram 18 and the compiler 22), and the database 30 may be located at a central site. The tableset T in the database 30 may be frequently changed by data drawn from one or more remote sites such that each such remote site has a source fileset that periodically causes updating and deletion of records in T. The Delta program 12 and the Trigger program 14 would exist at each such remote site. Thus, the data path 15 between the Trigger program 14 and the Bridge program 16, as well as the data path 25 between the Delta Program 12 and the Objectload Program 26, might represent a data communications network between the central site and the remote site. Definitionally, a data communications network comprises communication lines over which data is transmitted from one node to another, and each said node may include, inter alia, a computer, a terminal, a communication control unit, etc. This embodiment of the present invention is further discussed infra in conjunction with FIG. 12.

In another embodiment of the present invention, the Delta program 12, the Trigger program 14, the Bridge program 16, the Objectload program 26 (as well as the associated Sourcegen macroprogram 18 and the compiler 22), and the database 30 would all be located at one site rather than being distributed. This embodiment of the present invention is further discussed infra in conjunction with FIG. 13.

The Delta program 12, the Trigger program 14, the Bridge program 16, the Sourcegen macroprogram 18, and the Objectload program 26 have been referred to supra as programs. The term "program" is used herein to denote a computer program, a program module or subprogram of a software system, etc. Thus some or all of the aforementioned programs may be isolated computer programs or may be interconnected as modules or subprograms of a larger computer program or of a computer software package.

The following discussion presents aspects of the present invention in greater detail. These aspects include matters relating to the Delta program 12, the Trigger Program 14, and the Sourcegen macroprogram 18.

FIGS. 4–9 describe an example using the Delta program 12 in conjunction with 3 source files: $S_1$, $S_2$, and $S_3$ (N=3). For this example, FIGS. 4, 5, and 6 depict files $S_{1A}$, $S_{2A}$, $S_{3A}$ respectively embodying $S_1$, $S_2$, $S_3$ at times $t_A$, in accordance with embodiments of the present invention. FIGS. 4, 5 and 6 additionally depict files $S_{1B}$, $S_{2B}$, $S_{3B}$ respectively embodying $S_1$, $S_2$, $S_3$ at times $t_B$, in accordance with embodiments of the present invention. The tableset T is assumed to initially be consistent with $S_{1A}$, $S_{2A}$, $S_{3A}$ at time $t_A$, and in need of being updated to reflect $S_{1B}$, $S_{2B}$, $S_{3B}$ at time $t_B$. In FIGS. 4–6, the family relates to purchase orders with a family key $K_F$ of Purchase Order Number. Accordingly, all source files depicted in FIGS. 4–6 have the family key of Purchase Order Number in field 1. The source files $S_{1A}$ and $S_{1B}$ in FIG. 4 are general purchase order files having fields of Purchase Order Number, Purchase Order Date, and Purchase Order Point Location (i.e., the location from which the purchase order was placed). The source files $S_{2A}$ and $S_{2B}$ in FIG. 5 are purchase order—vendor files having fields of Purchase Order Number, Vendor Identification, Vendor Region (i.e., region of USA where the vendor is located: NE, NW, SE, SW), and Vendor Phone Number. The source files $S_{2A}$ and $S_{2B}$ in FIG. 5 are purchase order—vendor files having fields of Purchase Order Number, Vendor Identification, Vendor Region (i.e., region of USA where the vendor is located: NE, NW, SE, SW), and Vendor Phone Number. The source files $S_{3A}$ and $S_{3B}$ in FIG. 6 are purchase order—buyer files having fields of Purchase Order Number, Buyer Identification, Buyer Initials, and Buyer Phone Number.

In FIGS. 4–6, the source files of $S_{1B}$, $S_{2B}$, and $S_{3B}$ at time $t_B$ show changes (i.e., "Updates" and "Deletes") relative to the source files of $S_{1A}$, $S_{2A}$, and $S_{3A}$ at time $t_A$, as highlighted by an asterisk (*), a double asterisk (), or a triple asterisk (*) to the right of the rows or records having data to be updated or deleted in the tableset T. As stated supra, "Update" records of $S_{1B}$ relative to $S_{1A}$ and are either of two types. A "Modify" Update record (denoted by the asterisk *) reflects a change of data in one or more fields of a record already existing in $S_{1A}$, $S_{2A}$, $S_{3A}$, while an "Add" Update record (denoted by the double asterisk ) is a new record of data that did not exist in $S_{1A}$, $S_{2A}$, $S_{3A}$. Thus, the Update record includes two types of Update records, namely "Modify" Update records and "Add" Updates records, and the present invention may be implemented for either or both of Modify Update records and Add Update records. FIG. 6 illustrates a special type of Modify Update for Purchase Order Number 247 which had missing Buyer Phone Number at the time $t_A$ but included an explicit Buyer Phone Number at the time $t_B$. A "Delete" record of $S_{iB}$ relative to $S_{iA}$ (denoted by the triple asterisk *) is a record that appears in $S_{iA}$ but not in $S_{iB}$, and is thus a record that has been deleted from the source file.

Given the source file data of FIGS. 4–6, the Delta program 12 of FIG. 1 generates a dataset $D_{UP}$ of non-redundant family keyvalues embodying $K_F$ (i.e., Purchase Order Number) in the Update records of $S_{1B}$, $S_{2B}$, and $S_{3B}$. Similarly, the Delta program 12 generates a dataset $D_{DEL}$ of non-redundant family keyvalues embodying $K_F$ in the Delete records of $S_{1B}$, $S_{2B}$, and $S_{3B}$. A dataset is a collection a data such as a file or a table. A family keyvalue in a record is the value of the family key in the record. For example, the files $S_{1B}$, $S_{2B}$, and $S_{3B}$ in FIGS. 4–6 have family key values of 256, 204, 223, 203, 201, 247, 267, 219, 284, 255, 234, 246, 291, 292, and 293. Of the preceding keyvalues, only non-redundant keyvalues in the Update records of $S_{1B}$, $S_{2B}$, and $S_{3B}$ (considered collectively) are placed by the Delta program 12 in the output dataset $D_{UP}$. Similarly, only non-redundant keyvalues in the Delete records of $S_{1A}$, $S_{2A}$, and $S_{3A}$ (considered collectively) are placed by the Delta program 12 in the output dataset $D_{DEL}$.

Figure 7:
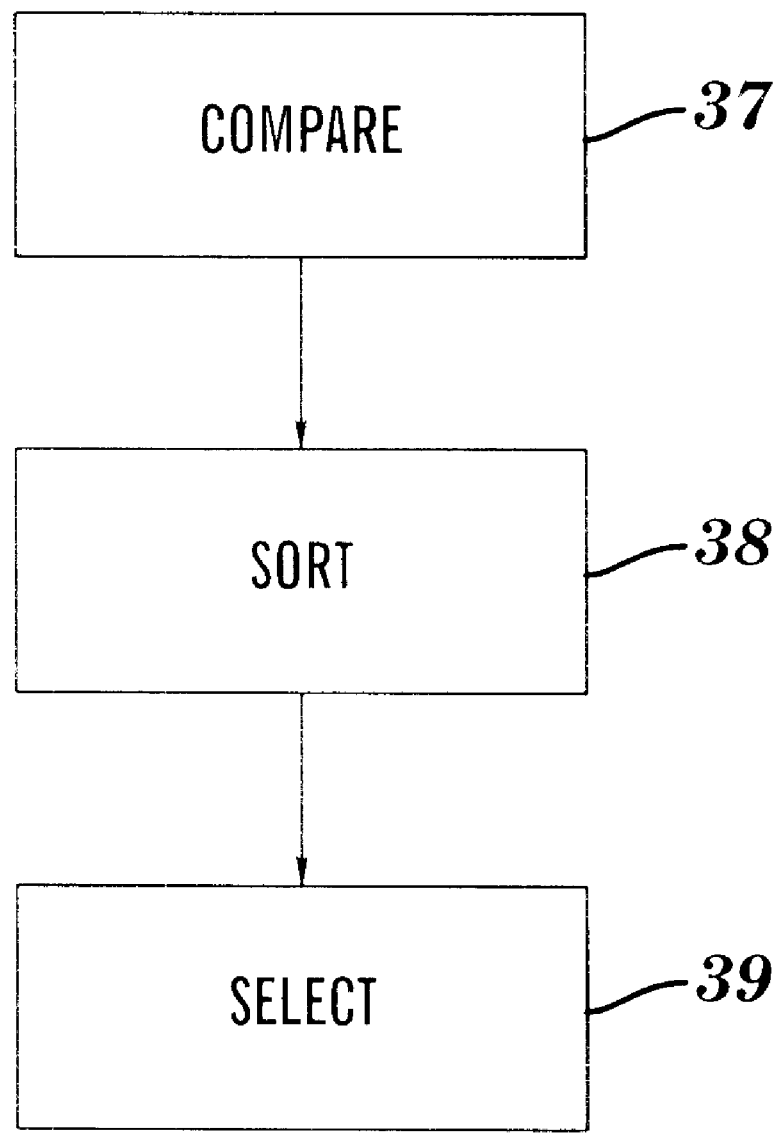
FIG. 7 is a flow chart of an embodiment of the Delta program of FIG. 3, in accordance with embodiments of the present invention.

FIG. 7 illustrates a flow chart of the Delta program 12 (see FIG. 1) that implements selection and placement of said non-redundant keyvalues in the dataset $D_{UP}$ or $D_{DEL}$, in accordance with embodiments of the present invention. In particular, FIG. 7 shows a three-step process of Compare 37, Sort 38, and Select 39.

FIG. 8 shows the result of how the Delta program 12 applies the aforementioned Compare 37, Sort 38, and Select 39 steps of FIG. 7 to Update records of the source file data of FIGS. 4–6, in accordance with embodiments of the present invention. In FIG. 8 the Compare array 33 shows the family keyvalues extracted from sequentially processing the source files $S_{1B}$, $S_{2B}$, and $S_{3B}$ in sequential order. The Compare 37 operation scans each of $S_{1B}$, $S_{2B}$, and $S_{3B}$ source files and performs comparisons with the $S_{1A}$, $S_{2A}$, and $S_{3A}$ source files to identify records in $S_{1B}$, $S_{2B}$, and $S_{3B}$ which have changed relative to $S_{1A}$, $S_{2A}$, and $S_{3A}$ (i.e., Modify Update records denoted by * in FIGS. 4–6) and to further identify new records in $S_{1B}$, $S_{2B}$, and $S_{3B}$ relative to $S_{1A}$, $S_{2A}$, and $S_{3A}$ (i.e., Add Update records denoted by ** in FIGS. 4–6). As each such Update record is so identified, the family keyvalue of the record is extracted and stored until the full Compare array 33 of FIG. 8 has been generated. Next, the Compare array 33 is sorted, resulting in the Sort array 34 shown in FIG. 8. Since the Sort array 34 has redundant keyvalues of 234, 247, 291, 292, and 293, said redundant keyvalues are removed from the Sort array 34, or equivalently the non-redundant keyvalues are selected from the Sort array 34, resulting in the Select array 35 of non-redundant keyvalues. The non-redundant keyvalues of the Select array 35 are next stored in the dataset $D_{UP}$ of FIG. 3.

Note that the Sort 38 step is a practical step in the flow chart of FIG. 7. Nonetheless, a person of ordinary skill in the art of computer programming would be able to generate the Select array 35 directly from the Compare array 33 without sorting and without undue experimentation. Thus, the Sort 38 step may be used but is not required. If the Sort 38 step is omitted, then the keyvalues in the dataset $D_{UP}$ will not necessarily be in sorted order, which is acceptable since the present invention requires that the keyvalues in the dataset $D_{UP}$ be non-redundant and does not require that the keyvalues in the dataset $D_{UP}$ be sorted. Accordingly, any departure of the Delta program 12 from the flow chart in FIG. 7 or from the description of the Delta program 12 herein, as would be known or obvious to one of ordinary skill in the art of computer programming, is within the scope of the present invention.

Figure 9:
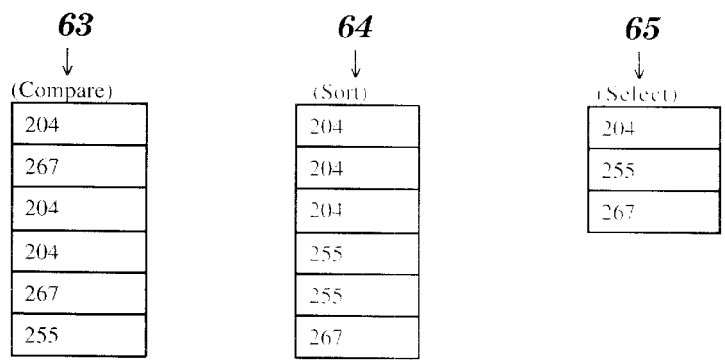
FIG. 9 depicts the result of applying the embodiment of the Delta program shown in FIG. 7 for Delete records of the source files $S_{1A}$, $S_{1B}$, $S_{2A}$, $S_{2B}$, $S_{3A}$, and $S_{3B}$ depicted in FIGS. 4–6, in accordance with embodiments of the present invention.

FIG. 9 shows the result of how the Delta program 12 applies the aforementioned Compare 37, Sort 38, and Select 39 steps of FIG. 7 to Delete records of the source file data of FIGS. 4–6, in accordance with embodiments of the present invention. In FIG. 9 the Compare array 63 shows the family keyvalues extracted from sequentially processing the source files $S_{1B}$, $S_{2B}$, and $S_{3B}$ in sequential order. The Compare 37 operation scans each of $S_{1A}$, $S_{2A}$, and $S_{3A}$ source files and performs comparisons with the $S_{1B}$, $S_{2B}$, and $S_{3B}$ source files to identify records in $S_{1A}$, $S_{AB}$, and $S_{3A}$ which do not appear in $S_{1B}$, $S_{2B}$, and $S_{3B}$ (i.e., Delete records denoted by \*\*\* in FIGS. 4–6). As each such Delete record is so identified, the family keyvalue of the record is extracted and stored until the full Compare array 63 of FIG. 9 has been generated. Next, the Compare array 63 is sorted, resulting in the Sort array 64 shown in FIG. 9. Since the Sort array 64 has redundant keyvalues of 204 and 255, said redundant keyvalues are removed from the Sort array 64, or equivalently the non-redundant keyvalues are selected from the Sort array 64, resulting in the Select array 65 of non-redundant keyvalues. The non-redundant keyvalues of the Select array 65 are next stored in the dataset $D_{DEL}$ of FIG. 3.

Note that the Sort 38 step is a practical step in the flow chart of FIG. 7. Nonetheless, a person of ordinary skill in the art of computer programming would be able to generate the Select array 65 directly from the Compare array 63 without sorting and without undue experimentation. Thus, the Sort 38 step may be used but is not required. If the Sort 38 step is omitted, then the keyvalues in the dataset $D_{DEL}$ will not necessarily be in sorted order, which is acceptable since the present invention requires that the keyvalues in the dataset $D_{DEL}$ be non-redundant and does not require that the keyvalues in the dataset $D_{DEL}$ be sorted. Accordingly, any departure of the Delta program 12 from the flow chart in FIG. 7 or from the description of the Delta program 12 herein, as would be known or obvious to one of ordinary skill in the art of computer programming, is within the scope of the present invention.

As shown in FIG. 3, the dataset $D_{UP}$ as generated by the Delta program 12 is processed by the Trigger program 14 to generate the fileset ΔS, which is then transformed by the Bridge Program 16 into the fileset ΔS for use in changing the tables $T_1, T_2, \ldots, T_M$ through Updates, in accordance with the Objectload program 26. In contrast, the dataset $D_{DEL}$ as generated by the Delta program 12 bypasses the Trigger program 14 and the Bridge Program 16, and is used more directly to change the tables $T_1, T_2, \ldots, T_M$ through Deletes, in accordance with the Objectload program 26.

Figure 10:
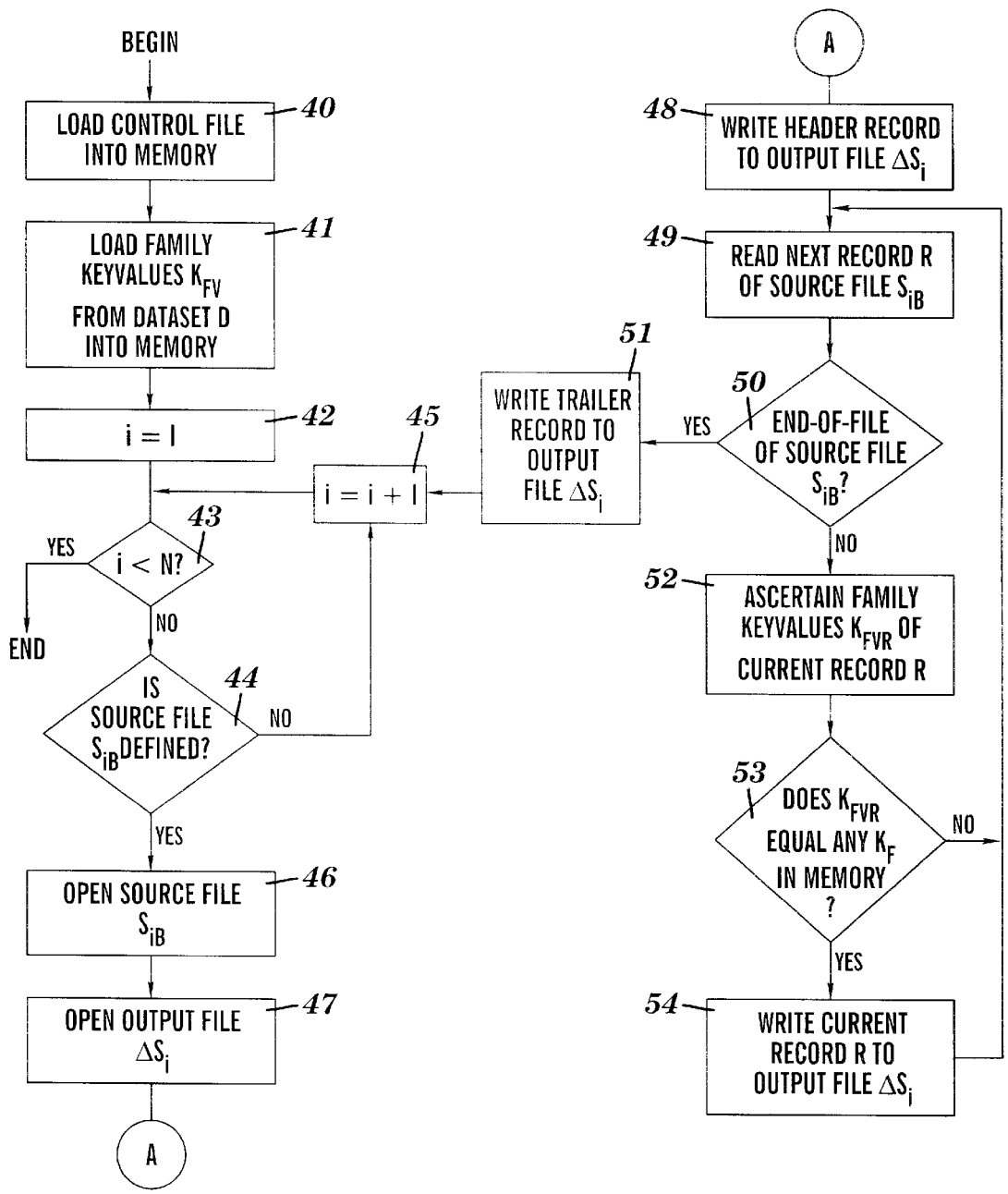
FIG. 10 depicts a flow chart of an embodiment of the Trigger program of FIG. 3 for generating an output fileset $\Delta S$, in accordance with embodiments of the present invention.

FIG. 10 depicts a flow chart of an embodiment of the Trigger program 14 for generating the fileset ΔS, in accordance with embodiments of the present invention. The Trigger program 14 steps through all records of $S_{iB}$, (for i=1, 2, . . . , N) to compare the family keyvalue $K_{FVR}$ of each record of $S_{iB}$ against the family keyvalues $K_{FV}$ in the dataset D. What is saved in each file $\Delta S_i$ (i=1, 2, . . . , N) is every record of SB for which $K_{FVR}$ equals one of the family keyvalues $K_{FV}$ in the dataset D.

In FIG. 10 and as shown in block 40, the Trigger program 14 initially loads control information into memory through, inter alia, a control file 11 shown in FIG. 3. The control file 11 includes data such as, inter alia, an identification of where the N source files $S_1, S_2, \ldots, S_N$ are located, an identification of the family, an identification of the family key, etc.

Figure 11:
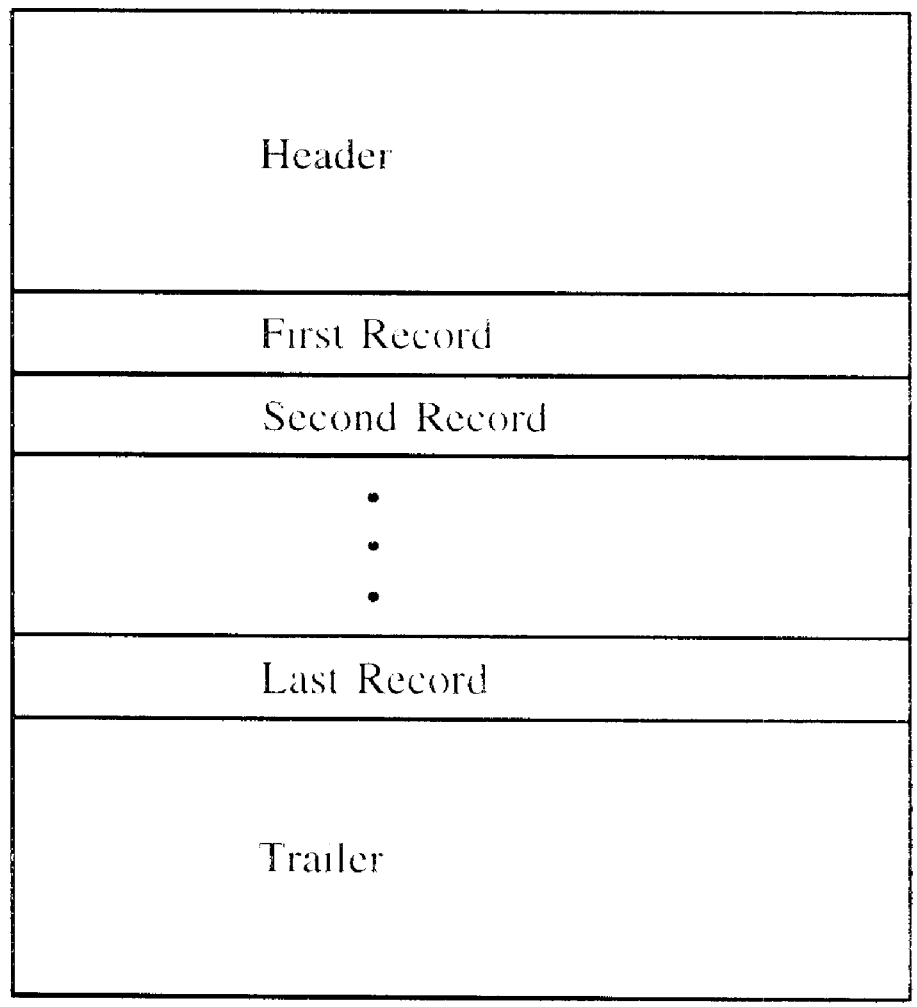
FIG. 11 depicts the structure of each file that is generated in accordance with FIG. 10, in accordance with embodiments of the present invention.

Block 41 of FIG. 10 indicates that the family keyvalues from the dataset D are to be loaded into memory in order to minimize access time to said family keyvalues during subsequent processing by the Trigger program 14. Block 42 sets a counter i to 1, wherein the counter i points to the source file $S_{iB}$. Decision block 43 asks whether i<N is satisfied in order to determine whether all N source files have been processed. If i=N, then the Trigger program 14 ENDs as shown. If i<N, then the source file $S_{iB}$ is processed beginning with the decision block 44 which asks whether the source file $S_{iB}$ exists. If $S_{iB}$ doesn't exist then block 45 steps the counter i by 1 and the decision block 43 is again entered to determine whether i<N. If $S_{iB}$ exists then the source file $S_{iB}$ is opened (block 46) and the output file $\Delta S_i$ is opened (block 47). Next, a header record may be written to the output file $\Delta S_i$ (block 48). Said header record may include data such as, inter alia, the current date, an identification of the family, a sequence number, etc. The sequence number is an update number or revision number that is incremented by a fixed amount (e.g., 1) each time that a ΔS fileset is generated, so that a receiving site of the ΔS fileset could check to determine that the received ΔS fileset has an expected sequence number. Block 49 reads the next record R of the source file $S_{iB}$. Decision block 50 asks whether the source file $S_{iB}$ is experiencing an End-Of-File (EOF) indication. If the source file $S_{iB}$ is experiencing an EOF indication, then at least one trailer record may be written to the output file $\Delta S_i$ (block 51), the counter i is stepped by 1 (block 45), and the decision block 43 is again entered to determine whether i<N (i.e., to determine whether all such $S_{iB}$ files have been processed). If the source file $S_{iB}$ is not experiencing an EOF indication, then the family keyvalue $K_{FVR}$ of the current $S_{iB}$ record R is ascertained (block 52). Next, the decision block 53 asks whether said $K_{FVR}$ equals any $K_{FV}$ in memory. If $K_{FVR}$ equals any $K_{FV}$ in memory, then the current record R of the source file $S_{iB}$ is written to the output file $\Delta S_i$ (block 54). Next, there is a return to the block 49 for reading the next record of the source file $S_{iB}$. FIG. 11 depicts the structure of each file $\Delta S_i$ that is generated in accordance with FIG. 10.

The trailer record in FIG. 10 (see block 51) may include any number of data items that could be generated through implementing the algorithm of FIG. 10. For example, the trailer record of $\Delta S_i$ may include the total number of records of $\Delta S_i$. As another example, the trailer record may include a cumulative dollar amount computed as a summation of corresponding individual dollar amounts in a given field of $\Delta S_i$, wherein the summation is performed over all records of $\Delta S_i$. For the preceding examples, the data in the trailer record could serve as a consistency check. For example, the Bridge program 16 (see FIG. 3), or another program at the site where the Bridge program 16 is located, could independently determine the total number of records of $\Delta S_i$ and the cumulative dollar amount, and compare said independently determined parameters with the corresponding parameters on the trailer record of $\Delta S_i$.

Any departure of the Trigger program 14 from the flow chart in FIG. 10 or from the description of the Trigger program 14 herein, as would be obvious to one of ordinary skill in the art of computer programming, is within the scope of the present invention.

The preceding discussion of FIGS. 4–10, in relation to the Delta program 12 and the Trigger program 14, demonstrates a highly efficient method of assembling data into the fileset ΔS from the source dataset S in order to subsequently change the tableset T through Updates and Deletes. First, only source records having changed data (i.e., Updated or Deleted data) are included in the dataset $D_{UP}$, the dataset $D_{DEL}$, and the fileset ΔS. Second, the family keyvalues, rather than source data records, are manipulated in the Delta program 12 and the Trigger program 14, which substantially reduces the amount of data that the Delta program 12 and the Trigger program 14 process. Third, elimination of redundant key-values prevents redundant source data records from being stored in the dataset $D_{UP}$, the dataset $D_{DEL}$, and the fileset $\Delta S$.

The Objectload Program 26 is used to change the tableset T with Updates as dictated by the fileset $\Delta S$, and with Deletes as dictated by the dataset $D_{DEL}$. The Objectload Program 26 may used to accomplished either Updates or Deletes, or both Updates and the Deletes. Additionally, the Updates and Deletes may be accomplished within one such Objectload Program 26, or alternatively the Updates and Deletes may each be accomplished by distinct and independent Objectload Programs 26.

Accomplishment of Deletes by the Objectload Program 26 is straightforward. The Objectload Program 26 deletes all records in the tables $T_1, T_2, \ldots, T_M$ that have a non-redundant family keyvalue of the dataset $D_{DEL}$. The records so deleted in the tables $T_1, T_2, \ldots, T_M$ are said to be "deletion-targeted." Thus any record in the tables $T_1, T_2, \ldots, T_M$ that has a non-redundant family keyvalue that exists in the dataset $D_{DEL}$ is deletion-targeted.

FIG. 3 shows how the Objectload Program 26 is generated. As stated supra, the Objectload program 26 is dynamically generated by utilizing the Sourcegen macroprogram 18 to generate source code 20 that is compiled by the compiler 22 into object code 24. The object code 24 serves as the Objectload program 26. The source code 20 and the compiler 22 may be in conjunction with any computer language such as PL-1, C, C++, etc. The Sourcegen macroprogram 18 includes macros, wherein a macro is an instruction written as part of a source language that will expand into multiple source language instructions when compiled. Thus, the Sourcegen macroprogram 18 is itself compiled so as to generate the source code 20. As shown in FIG. 3, the Sourcegen macroprogram 18 reads an input file 17 as input. The input file 17 comprises whatever control information is needed for enabling the Sourcegen macroprogram 18 to generate the source code 20 (and thus the Objectload program 26 downstream) for updating $T_m$ based on data in $\Delta T_m$, for m=1, 2, . . . , M. Accordingly, the input file 17 includes parameters comprising at least one of: an identification of $\Delta T_m$, a data format description of $\Delta T_m$, an identification of $T_m$, a data format description of $T_m$, and a "tweak" flag. A tweak flag informs the Sourcegen macroprogram 18, and thus also the Objectload program 26, to implement special/ tailored coding for selective updating of targeted fields in a record without processing the whole record in order to reduce computational effort. The input file 17 also includes control information for performing Deletes on the tableset T in accordance with the dataset $D_{DEL}$.

The Objectload program 26 may function without being subject to either of two types of read lockout. If the first type of read lockout were to occur, then an updating or deleting of records of the family tables by the Objectload program 26 would lock out other users who are reading the family tables until the updating ends. If the second type of read lockout were to occur, then read operations on the family tables by other users would prevent the Objectload program 26 from updating or deleting records of the family tables while the operations by other users are occurring. Fortunately, neither type of read lockout occurs with the Objectload program 26. The term "read lockout," as used herein, includes both the first type and the second type of read lockout. In contrast with the Objectload program 26, a database management system (DBMS) may implement a read lockout for a data transaction (i.e., a data read or data write) on any table $T_A$ in the DBMS if said data transaction on the table $T_A$ is executed through a transaction statement of the DBMS (e.g., a SELECT statement of a DBMS such as ORACLE that is based on Structured Query Language). Thus, the Objectload program 26 could coexist with a DBMS that implements such a read lockout without the Objectload program 26 being subject to the read lockout, because data reading and writing by the Objectload program 26 does not occur through transaction statements of the DBMS.

The preceding feature of avoiding read lockout may be applied selectively with respect to Updates and Deletes on the tableset T, as illustrated in the following examples. As a first example, read lockout may be avoided on Updates but not on Deletes, or vice versa. As a second example, read lockout may be avoided on both Updates and Deletes. As a third example, read lockout may applied to both Updates and Deletes.

The preceding discussion demonstrates that the methodology of the present invention for loading data into the tableset T is highly efficient. First, the present invention uses object code (i.e., the Objectload program 26 of FIG. 3), rather than less inherently efficient interpreted code, to directly load data into T. Second, transaction statements of a DBMS, which are highly inefficient for reading and writing onto database tables, are avoided. Third, the present invention loads the tableset T while avoiding read lockout, which maximizes use of a database for both users of the present invention and other users of the DBMS.

While the preceding discussion of updating the tableset T of the database 30 was based on processing each table $T_m$ (m=1, 2, . . . , M) separately, and on generating each of the M Objectload programs 26 separately, the system 10 could be modified to have the Sourcegen Macroprogram 18 generate the source code 20 such that the all M tables $T_1, T_2, \ldots, T_M$ are updated by one source code 20 and by one Objectload program (O) 26, instead of by the M source codes 20 and M Objectload programs $(O_1, O_2, \ldots, O_M)$ 26. Thus the present invention requires at least one source code 20 and at least one Objectload program 26 to update the M tables $T_1, T_2, \ldots, T_M$.

Any departure of the flow chart in FIG. 3 of the path from the Sourcegen Macroprogram 18 to the Objectload program 26 or from the description thereof herein, as would be obvious to one of ordinary skill in the art of computer programming, is within the scope of the present invention.

Although the present invention beneficially uses the Objectload program 26 for changing the tableset T by Updates and Deletes, the present invention may alternatively use a less efficient program of source statements (e.g., SQL statements) that are interpreted instead of being compiled, since the use of a family key, and other techniques discussed herein, in the Delta Program 12 and the Trigger Program 14 adds substantial efficiency regardless of whether the Objectload program 26 is used. The present invention may also use the Objectload program 26 selectively with respect to Updates and Deletes applied to the fileset T. For example, the Objectload program 26 may be used for Updates, while Deletes are implemented by an interpreter of source code such as SQL code, and vice versa.

Figure 12:
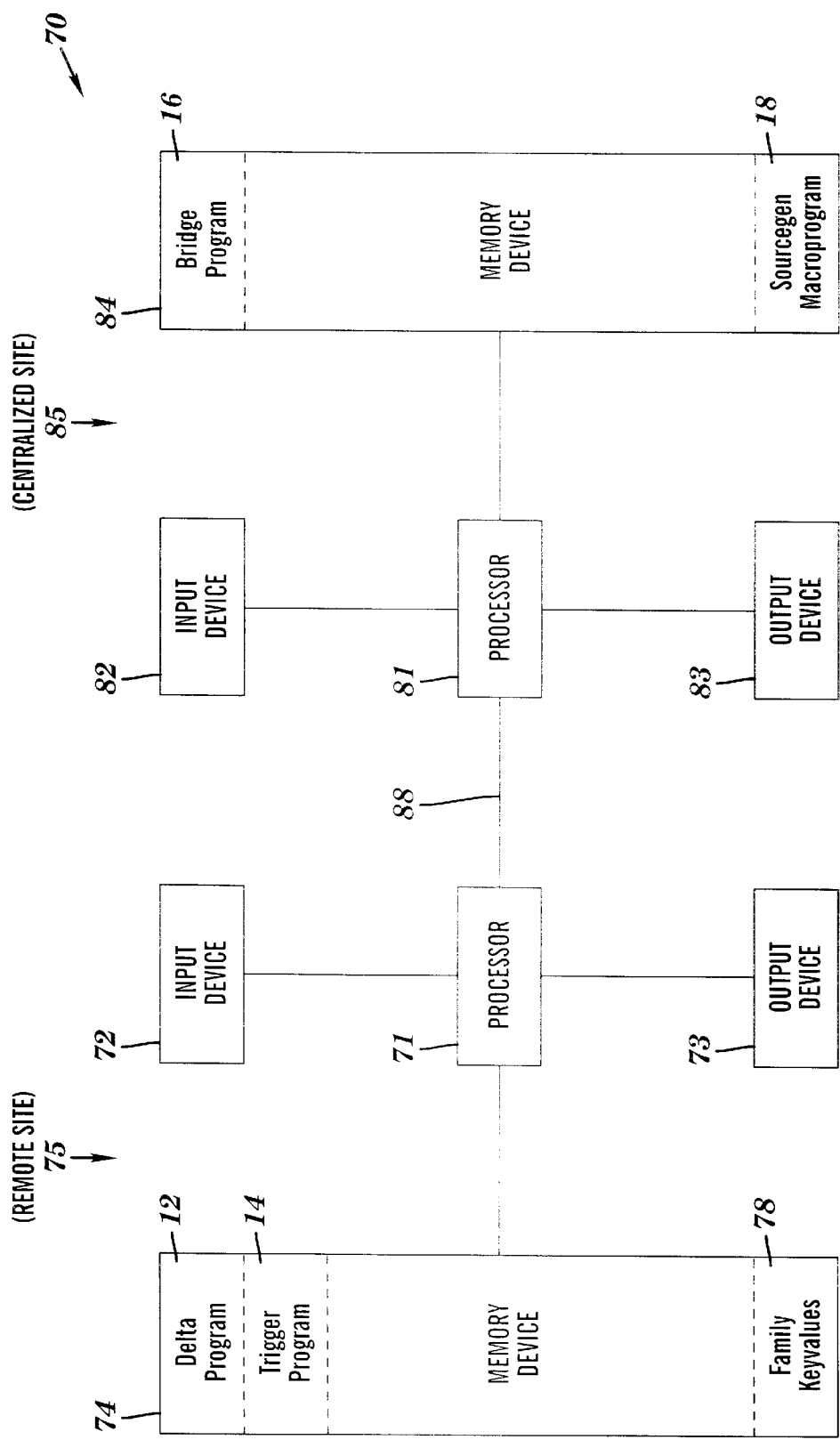
FIG. 12 is a block diagram of a first computer configuration for the system of FIG. 3, in accordance with embodiments of the present invention.

FIG. 12 is a block diagram of a first computer configuration for the system of FIG. 3, in accordance with embodiments of the present invention. FIG. 12 illustrates a computer system 70 for performing Updates and Deletes on the M tables $T_1, T_2, \ldots, T_m$ of a family as described supra, in accordance with embodiments of the present invention. The computer system 70 comprises a centralized site 85 and a remote site 75. The centralized site 85 and the remote site 75 communicate over a data communications network 88 such was described supra in conjunction with the data paths 15 and 25 of FIG. 3.

The centralized site 85 includes a processor 81, an input device 82 (representing at least one input device) coupled to the processor 81, an output device 83 (representing at least one output device) coupled to the processor 81, and a memory device 84 (representing at least one memory device) coupled to the processor 81. The input device 82 may be, inter alia, a keyboard, a mouse, etc. The output device 83 may be, inter alia, a printer, a plotter, a computer screen, a magnetic tape, a removable hard disk, a floppy disk, etc. The memory device 84 may be, inter alia, a hard disk, a dynamic random access memory (DRAM), a read-only memory (ROM), etc. The memory device 84 stores the Bridge program 16 and the Sourcegen macroprogram 18. The processor 81 executes the Bridge program 16 and the Sourcegen macroprogram 18. The memory device 84 includes input data for the Bridge program 16 and the Sourcegen macroprogram 18. The output device 83 displays output from Bridge program 16 and the Sourcegen macroprogram 18. Additionally, the output device 83 may be used to display output, source code, graphics, etc.

The remote site 75 includes a processor 71, an input device 72 (representing at least one input device) coupled to the processor 71, an output device 73 (representing at least one output device) coupled to the processor 71, and a memory device 74 (representing at least one memory device) coupled to the processor 71. The input device 72 may be, inter alia, a keyboard, a mouse, etc. The output device 73 may be, inter alia, a printer, a plotter, a computer screen, a magnetic tape, a removable hard disk, a floppy disk, etc. The memory device 74 may be, inter alia, a hard disk, a dynamic random access memory (DRAM), a read-only memory (ROM), etc. The memory device 74 stores the Delta program 12, the Trigger program 14, and the family keyvalues 78. The processor 71 executes the Delta program 12 and the Trigger program 14. The memory device 74 includes input data for the Delta program 12 and the Trigger 14 program. The output device 73 displays output from Delta program 12 and the Trigger program 14. Additionally, the output device 73 may be used to display output, source code, graphics, etc.

While FIG. 12 shows the computer system 70 as a particular configuration of hardware and software, any configuration of hardware and software, as would be known to a person of ordinary skill in the art, may be utilized for the purposes stated supra in conjunction with the particular computer system 70 of FIG. 12. For example, the Bridge program 16 and the Sourcegen macroprogram 18 may be in memory devices and may be executed by different processors.

Figure 13:
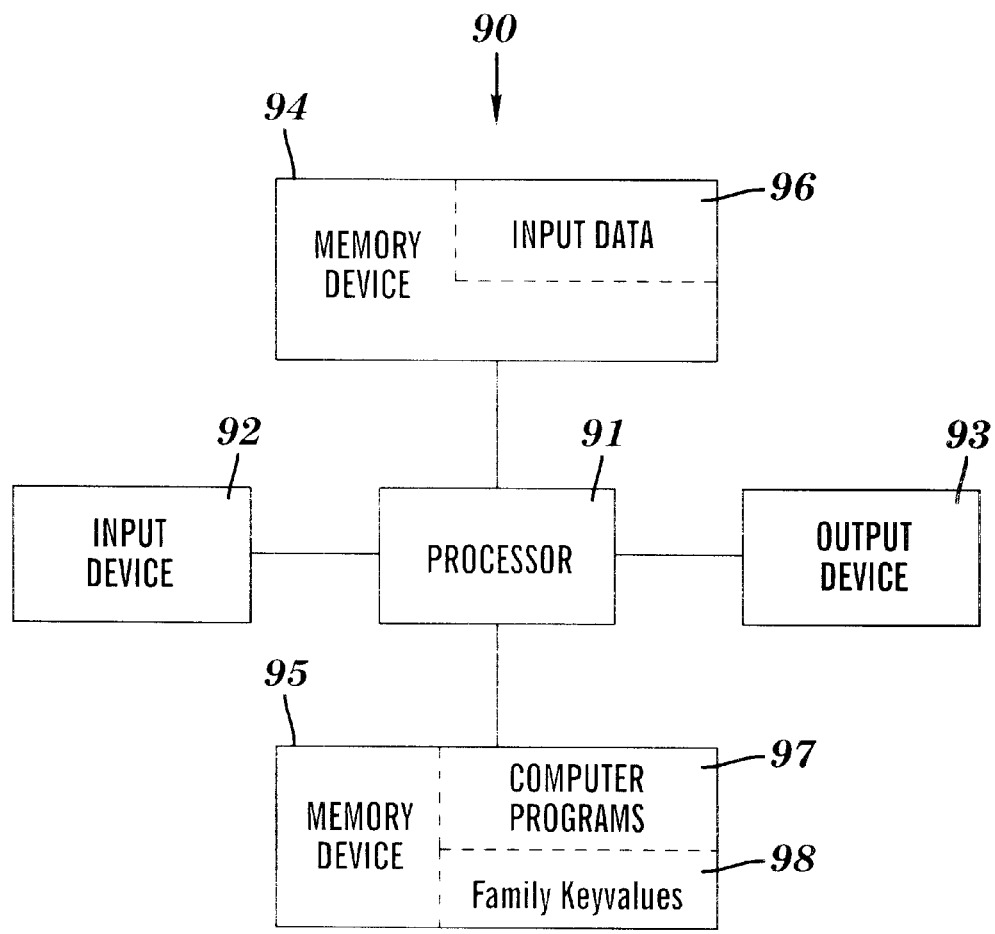
FIG. 13 is a block diagram of a second computer configuration for the system of FIG. 3, in accordance with embodiments of the present invention.

FIG. 13 is a block diagram of a second computer configuration for the system of FIG. 3, in accordance with embodiments of the present invention. FIG. 13 illustrates a computer system 90 for performing Updates and Deletes on the M tables $T_1, T_2, \ldots, T_m$ of a family as described supra, in accordance with embodiments of the present invention. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a mouse, etc. The output device 93 may be, inter alia, a printer, a plotter, a computer screen, a magnetic tape, a removable hard disk, a floppy disk, etc. The memory devices 94 and 95 may be, inter alia, a hard disk, a dynamic random access memory (DRAM), a read-only memory (ROM), etc. The memory device 95 includes a computer programs 97 (i.e., the Delta program 12, the Trigger program 14, the Bridge program 16, and the Sourcegen macroprogram 18 (see FIG. 3) and the family keyvalues 98. The processor 91 executes the computer programs 97. The memory device 94 includes input data 96. The input data 96 includes input required by the computer programs 97. The output device 93 displays output from the computer programs 97.

While FIG. 13 shows the computer system 90 as a particular configuration of hardware and software, any configuration of hardware and software, as would be known to a person of ordinary skill in the art, may be utilized for the purposes stated supra in conjunction with the particular computer system 90 of FIG. 13. For example, the memory devices 94 and 95 may be portions of a single memory device rather than separate memory devices. While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A system for updating records in a tableset T of a family, in relation to

N source files denoted as $S_1, S_2, \ldots, S_N$, said N at least 1, said tableset T having M tables $T_1 T_2, \ldots, T_M$, said M at least 1, said N source files logically associated with said M tables, said family having a common family key $K_F$ across the M tables and across the N source files, a fileset $S_A$ comprising files $S_{1A}, S_{2A}, \ldots, S_{NA}$ respectively embodying $S_1, S_2, \ldots, S_N$ at a time $t_A$ such that $T_1, T_2, \ldots, T_M$ at the time $t_A$ accurately reflects $S_A$, and a fileset $S_B$ comprising files $S_{1B}, S_{2B}, \ldots, S_{NB}$ respectively embodying $S_1, S_2, \ldots, S_N$ at a time $t_B$, said $t_B$ and $t_A$ being different times, the system comprises:

a Delta program adapted to generate a dataset $D_{UP}$ of non-redundant family keyvalues embodying $K_F$, each said non-redundant family keyvalue drawn from selected Update records of $S_{iB}$ relative to $S_{iA}$, said selected Update records not having any redundant family keyvalues, for i=1, 2, . . . , N;

a Trigger program adapted, for i=1, 2, . . . , N: to step through all records of $S_{iB}$, including to compare the family keyvalue $K_{FVR}$ within each record of $S_{iB}$ against the family keyvalues in the dataset $D_{UP}$ and to save in a file $\Delta S_i$ each said record of $S_{iB}$ for which $K_{FVR}$ equals one of the family keyvalues $K_{FV}$ in the dataset $D_{UP}$;

a Bridge program adapted to generate files $\Delta T_1$, $\Delta T_2, \ldots, \Delta T_M$ that includes the data in $\Delta S_1$, $\Delta S_2, \ldots, \Delta S_N$ in a form that is compatible with the M tables $T_1, T_2, \ldots, T_M$, respectively; and at least one Load program adapted to update the tables $T_1, T_2, \ldots, T_M$ with the data in $\Delta T_1, \Delta T_2, \ldots, \Delta T_M$, respectively.

2. The system of claim 1, said Delta program adapted to generate the dataset $D_{UP}$ subject to $t_B$ being later than $t_A$.

3. The system of claim 1, said Delta program adapted to generate the dataset $D_{UP}$ subject to $t_B$ being earlier than $t_A$.

4. The system of claim 1, said Delta program adapted to generate the dataset $D_{UP}$ comprising:

to generate an array A of candidate family keyvalues drawn from all Update records of $S_{iB}$ relative to $S_{iA}$ for i=1, 2, . . . , N; and to form $D_{UP}$ by having in $D_{UP}$ only those candidate family keyvalues from the array A that are non-redundant.

5. The system of claim 1, said Delta program adapted to generate the dataset $D_{UP}$ comprising:
   to generate an array A of candidate family keyvalues drawn from all Update records of $S_{iB}$ relative to $S_{iA}$ for i=1, 2, ..., N;
   to sort the candidate family keyvalues in the array A; and
   to form $D_{UP}$ by having in $D_{UP}$ only those candidate family keyvalues of the array A that are non-redundant.

6. The system of claim 1, wherein the Bridge program is linked to the Trigger program by a data communications network.

7. The system of claim 1, wherein to step through all records of $S_{iB}$ includes to store the family keyvalues of the dataset $D_{UP}$ within a computer memory, said computer memory being utilized for said comparing the keyvalue $K_{FVR}$ within each record of $S_{iB}$ against the family keyvalues $K_{FV}$ in the dataset $D_{UP}$.

8. The system of claim 1, wherein said selected Update records include Modify Update records but do not include Add Update records.

9. The system of claim 1, wherein said selected Update records include Add Update records but do not include Modify Update records.

10. The system of claim 1, wherein the Trigger program is adapted to read a control file and to utilize data therefrom, said data from the control file selected from the group consisting of an identification of where the source files $S_1$, $S_2$, ..., $S_N$ are located, an identification of the family, an identification of the family key, and combinations thereof.

11. The system of claim 1, wherein the files $\Delta S_1$, $\Delta S_2$, ..., $\Delta S_N$ each comprise a header record that includes data selected from the group consisting of a current date, an identification of the family, a sequence number, and combinations thereof.

12. The system of claim 1, wherein for i=1, 2, ..., N, the delta source file $\Delta S_i$ comprises a trailer record that includes data selected from the group consisting of a total number of records of $\Delta S_i$ and a cumulative dollar amount computed as a summation of corresponding individual dollar amounts in a given field of $\Delta S_i$ wherein the summation is performed over all records of $\Delta S_i$.

13. A system for updating records in a tableset T of a family, in relation to
   N source files denoted as $S_1$, $S_2$, ..., $S_N$, said N at least 1, said tableset T having M tables $T_1$, $T_2$, ..., $T_M$, said M at least 1, said N source files logically associated with said M tables, said family having a common family key $K_F$ across the M tables and across the N source files,
   a fileset $S_A$ comprising files $S_{1A}$, $S_{2A}$, ..., $S_{NA}$ respectively embodying $S_1$, $S_2$, ..., $S_N$ at a time $t_A$ such that $T_1$, $T_2$, ..., $T_M$ at the time $t_A$ accurately reflects $S_A$, and
   a fileset $S_B$ comprising files $S_{1B}$, $S_{2B}$, ..., $S_{NB}$ respectively embodying $S_1$, $S_2$, ..., $S_N$ at a time $t_B$, said $t_B$ and $t_A$ being different times,
   the system comprises:
      a Delta program adapted to generate a dataset $D_{UP}$ of non-redundant family keyvalues embodying $K_F$, each said non-redundant family keyvalue drawn from selected Update records of $S_{iB}$ relative to $S_{iA}$, said selected Update records not having any redundant family keyvalues, for i=1, 2, ..., N;
      a Trigger program adapted, for i=1, 2, ..., N: to step through all records of $S_{iB}$, including to compare the family keyvalue $K_{FVR}$ within each record of $S_{iB}$ against the family keyvalues in the dataset $D_{UP}$ and to save in a file $\Delta S_i$ each said record of $S_{iB}$ for which $K_{FVR}$ equals one of the family keyvalues $K_{FV}$ in the dataset $D_{UP}$;
      a Bridge program adapted to generate files $\Delta T_1$, $\Delta T_2$, ..., $\Delta T_M$ that includes the data in $\Delta S_1$, $\Delta S_2$, ..., $\Delta S_N$ in a form that is compatible with the M tables $T_1$, $T_2$, ..., $T_M$, respectively; and
      at least one Objectload program in object code form adapted to update the tables $T_1$, $T_2$, ..., $T_M$ with the data in $\Delta T_1$, $\Delta T_2$, ..., $\Delta T_M$, respectively.

14. The system of claim 13, wherein the Bridge program is linked to the Trigger program by a data communications network.

15. A system for updating records in a tableset T of a family, in relation to
   N source files denoted as $S_1$, $S_2$, ..., $S_N$, said N at least 1, said tableset T having M tables $T_1$, $T_2$, ..., $T_M$, said M at least 1, said N source files logically associated with said M tables, said family having a common family key $K_F$ across the M tables and across the N source files,
   a fileset $S_A$ comprising files $S_{1A}$, $S_{2A}$, ..., $S_{NA}$ respectively embodying $S_1$, $S_2$, ..., $S_N$ at a time $t_A$ such that $T_1$, $T_2$, ..., $T_M$ at the time $t_A$ accurately reflects $S_A$, and
   a fileset $S_B$ comprising files $S_{1B}$, $S_{2B}$, ..., $S_{NB}$ respectively embodying $S_1$, $S_2$, ..., $S_N$ at a time $t_B$, said $t_B$ and $t_A$ being different times,
   the system comprises:
      a Delta program adapted to generate a dataset $D_{UP}$ of non-redundant family keyvalues embodying $K_F$, each said non-redundant family keyvalue drawn from selected Update records of $S_{iB}$ relative to $S_{iA}$, said selected Update records not having any redundant family keyvalues, for i=1, 2, ..., N;
      a Trigger program adapted, for i=1, 2, ..., N: to step through all records of $S_{iB}$, including to compare the family keyvalue $K_{FVR}$ within each record of $S_{iB}$ against the family keyvalues in the dataset $D_{UP}$ and to save in a file $\Delta S_i$ each said record of $S_{iB}$ for which $K_{FVR}$ equals one of the family keyvalues $K_{FV}$ in the dataset $D_{UP}$;
      a Bridge program adapted to generate files $\Delta T_1$, $\Delta T_2$, ..., $\Delta T_M$ that includes the data in $\Delta S_1$, $\Delta S_2$, ..., $\Delta S_N$ in a form that is compatible with the M tables $T_1$, $T_2$, ..., $T_M$, respectively; and
      a Sourcegen macroprogram adapted to generate at least one Sourceload program at a source code level, said at least one Sourceload program adapted to being compiled into a corresponding at least one Objectload program in object code form, said at least one Objectload program adapted to update the tables $T_1$, $T_2$, ..., $T_M$ with the data in $\Delta T_1$, $\Delta T_2$, ..., $\Delta T_M$, respectively.

16. The system of claim 15, wherein for m=1, 2, ..., M, to generate the at least one Sourceload program includes to utilize control parameters, said control parameters comprising at least one of: an identification of $\Delta T_m$, a data format description of $\Delta T_m$, an identification of $T_m$, and a data format description of $T_m$.

17. The system of claim 16, said control parameters further including a tweak flag.

18. The system of claim 15, wherein the Bridge program is linked to the Trigger program by a data communications network.

19. A system for updating records in a tableset T of a family, in relation to

N source files denoted as $S_1, S_2, \ldots, S_N$, said N at least 1, said tableset T having M tables $T_1, T_2, \ldots, T_M$, said M at least 1, said N source files logically associated with said M tables, said family having a common family key $K_F$ across the M tables and across the N source files, a fileset $S_A$ comprising files $S_{1A}, S_{2A}, \ldots, S_{NA}$ respectively embodying $S_1, S_2, \ldots, S_N$ at a time $t_A$ such that $T_1, T_2, \ldots, T_M$ at the time $t_A$ accurately reflects $S_A$, and a fileset $S_B$ comprising files $S_{1B}, S_{2B}, \ldots, S_{NB}$ respectively embodying $S_1, S_2, \ldots, S_N$ at a time $t_B$, said $t_B$ and $t_A$ being different times, the system comprises:

a Delta program adapted to generate a dataset $D_{UP}$ of non-redundant family keyvalues embodying $K_F$, each said non-redundant family keyvalue drawn from selected Update records of $S_{iB}$ relative to $S_{iA}$, said selected Update records not having any redundant family keyvalues, for $i=1, 2, \ldots, N$;

a Trigger program adapted, for $i=1, 2, \ldots, N$: to step through all records of $S_{iB}$, including to compare the family keyvalue $K_{FVR}$ within each record of $S_{iB}$ against the family keyvalues in the dataset $D_{UP}$ and to save in a file $\Delta S_i$ each said record of $S_{iB}$ for which $K_{FVR}$ equals one of the family keyvalues $K_{FV}$ in the dataset $D_{UP}$;

a Bridge program adapted to generate files $\Delta T_1, \Delta T_2, \ldots, \Delta T_M$ that includes the data in $\Delta S_1, \Delta S_2, \ldots, \Delta S_N$ in a form that is compatible with the M tables $T_1, T_2, \ldots, T_M$, respectively; and a Sourcegen macroprogram adapted to generate at least one Sourceload program at a source code level, said at least one Sourceload program adapted to being compiled into a corresponding at least one Objectload program in object code form, said at least one Objectload program adapted to update the tables $T_1, T_2, \ldots, T_M$ with the data in $\Delta T_1, \Delta T_2, \ldots, \Delta T_M$, respectively, such that a read lockout does not occur while $T_1, T_2, \ldots, T_M$ are being updated, said $T_1, T_2, \ldots, T_M$ stored in a database of a database management system (DBMS) having the read lockout for a data transaction on any table $T_A$ in the DBMS if said data transaction on $T_A$ is executed through a transaction statement of the DBMS.

20. The system of claim 19, wherein the Bridge program is linked to the Trigger program by a data communications network.

21. A method for updating records in a tableset T of a family, in relation to

N source files denoted as $S_1, S_2, \ldots, S_N$, said N at least 1, said tableset T having M tables $T_1, T_2, \ldots, T_M$, said M at least 1, said N source files logically associated with said M tables, said family having a common family key $K_F$ across the M tables and across the N source files, a fileset $S_A$ comprising files $S_{1A}, S_{2A}, \ldots, S_{NA}$ respectively embodying $S_1, S_2, \ldots, S_N$ at a time $t_A$ such that $T_1, T_2, \ldots, T_M$ at the time $t_A$ accurately reflects $S_A$, and a fileset $S_B$ comprising files $S_{1B}, S_{2B}, \ldots, S_{NB}$ respectively embodying $S_1, S_2, \ldots, S_N$ at a time $t_B$, said $t_B$ and $t_A$ being different times, the method comprises:

executing a Delta program, including generating a dataset $D_{UP}$ of non-redundant family keyvalues embodying $K_F$, each said non-redundant family keyvalue drawn from selected Update records of $S_{iB}$ relative to $S_{iA}$, said selected Update records not having any redundant family keyvalues, for $i=1, 2, \ldots, N$;

executing a Trigger program, including for $i=1, 2, \ldots, N$: stepping through all records of $S_{iB}$, including comparing the family keyvalue $K_{FVR}$ within each record of $S_{iB}$ against the family keyvalues in the dataset $D_{UP}$ and saving in a file $\Delta S_i$ each said record of $S_{iB}$ for which $K_{FVR}$ equals one of the family keyvalues $K_{FV}$ in the dataset $D_{UP}$;

executing a Bridge program, including generating files $\Delta T_1, \Delta T_2, \ldots, \Delta T_M$ that includes the data in $\Delta S_1, \Delta S_2, \ldots, \Delta S_N$ in a form that is compatible with the M tables $T_1, T_2, \ldots, T_M$, respectively; and executing at least one Load program, including updating the tables $T_1, T_2, \ldots, T_M$ with the data in $\Delta T_1, \Delta T_2, \ldots, \Delta T_M$, respectively.

22. The method of claim 21, said Delta program generating the dataset $D_{UP}$ subject to $t_B$ being later than $t_A$.

23. The method of claim 21, said Delta program generating the dataset $D_{UP}$ subject to $t_B$ being later than $t_A$.

24. The method of claim 21, said executing the Delta program and generating the dataset $D_{UP}$ comprising:

generating an array A of candidate family keyvalues drawn from all Update records of $S_{iB}$ relative to $S_{iA}$ for $i=1, 2, \ldots, N$; and forming $D_{UP}$ by having in $D_{UP}$ only those candidate family keyvalues of the array A that are non-redundant.

25. The method of claim 21, said executing the Delta program and generating the dataset $D_{UP}$ comprising:

generating an array A of candidate family keyvalues drawn from all Update records of $S_{iB}$ relative to $S_{iA}$ for $i=1, 2, \ldots, N$;

sorting the candidate family keyvalues in the array A; and forming $D_{UP}$ by having in $D_{UP}$ only those candidate family keyvalues of the array A that are non-redundant.

26. The method of claim 21, wherein the Bridge program is linked to the Trigger program by a data communications network.

27. The method of claim 21, wherein executing the Trigger program and stepping through all records of $S_{iB}$ includes storing the family keyvalues of the dataset $D_{UP}$ within a computer memory, said computer memory being utilized for said comparing the keyvalue $K_{FV}$ within each record of $S_{iB}$ against the family keyvalues in the dataset $D_{UP}$.

28. The method of claim 21, wherein said selected Update records include Modify Update records but do not include Add Update records.

29. The method of claim 21, wherein said selected Update records include Add Update records but do not include Modify Update records.

30. The method of claim 21, wherein executing the Trigger program includes reading a control file and utilizing data therefrom, said data from the control file selected from the group consisting of an identification of where the source files $S_1, S_2, \ldots, S_N$ are located, an identification of the family, an identification of the family key, and combinations thereof.

31. The method of claim 21, wherein the files $\Delta S_1, \Delta S_2, \ldots, \Delta S_N$ each comprise a header record that includes data selected from the group consisting of a current date, an identification of the family, a sequence number, and combinations thereof.

32. The method of claim 21, wherein for $i=1, 2, \ldots, N$, the delta source file $\Delta S_i$ comprises a trailer record that includes data selected from the group consisting of a total number of records of $\Delta S_i$ and a cumulative dollar amount computed as a summation of corresponding individual dollar amounts in a given field of $\Delta S_i$ wherein the summation is performed over all records of $\Delta S_i$.

33. A method for updating records in a tableset T of a family, in relation to

N source files denoted as $S_1, S_2, \ldots, S_N$, said N at least 1, said tableset T having M tables $T_1, T_2, \ldots, T_M$, said M at least 1, said N source files logically associated with said M tables, said family having a common family key $K_F$ across the M tables and across the N source files, a fileset $S_A$ comprising files $S_{1A}, S_{2A}, \ldots, S_{NA}$ respectively embodying $S_1, S_2, \ldots, S_N$ at a time $t_A$ such that $T_1, T_2, \ldots, T_M$ at the time $t_A$ accurately reflects $S_A$, and a fileset $S_B$ comprising files $S_{1B}, S_{2B}, \ldots, S_{NB}$ respectively embodying $S_1, S_2, \ldots, S_N$ at a time $t_B$, said $t_B$ and $t_A$ being different times, the method comprises:
executing a Delta program, including generating a dataset $D_{UP}$ of non-redundant family keyvalues embodying $K_F$, each said non-redundant family keyvalue drawn from selected Update records of $S_{iB}$ relative to $S_{iA}$, said selected Update records not having any redundant family keyvalues, for $i=1, 2, \ldots, N$;

executing a Trigger program, including for $i=1, 2, \ldots, N$: stepping through all records of $S_{iB}$, including comparing the family keyvalue $K_{FVR}$ within each record of $S_{iB}$ against the family keyvalues in the dataset $D_{UP}$ and saving in a file $\Delta S_i$ each said record of $S_{iB}$ for which $K_{FVR}$ equals one of the family keyvalues $K_{FV}$ in the dataset $D_{UP}$;

executing a Bridge program, including generating files $\Delta T_1, \Delta T_2, \ldots, \Delta T_M$ that includes the data in $\Delta S_1, \Delta S_2, \ldots, \Delta S_N$ in a form that is compatible with the M tables $T_1, T_2, \ldots, T_M$, respectively; and executing at least one Objectload program, including updating the tables $T_1, T_2, \ldots, T_M$ with the data in $\Delta T_1, \Delta T_2, \ldots, \Delta T_M$, respectively.

34. The method of claim 33, wherein the Bridge program is linked to the Trigger program by a data communications network.

35. A method for updating records in a tableset T of a family, in relation to

N source files denoted as $S_1, S_2, \ldots, S_N$, said N at least 1, said tableset T having M tables $T_1, T_2, \ldots, T_M$, said M at least 1, said N source files logically associated with said M tables, said family having a common family key $K_F$ across the M tables and across the N source files, a fileset $S_A$ comprising files $S_{1A}, S_{2A}, \ldots, S_{NA}$ respectively embodying $S_1, S_2, \ldots, S_N$ at a time $t_A$ such that $T_1, T_2, \ldots, T_M$ at the time $t_A$ accurately reflects $S_A$, and a fileset $S_B$ comprising files $S_{1B}, S_{2B}, \ldots, S_{NB}$ respectively embodying $S_1, S_2, \ldots, S_N$ at a time $t_B$, said $t_B$ and $t_A$ being different times, the method comprises:
executing a Delta program, including generating a dataset $D_{UP}$ of non-redundant family keyvalues embodying $K_F$, each said non-redundant family keyvalue drawn from selected Update records of $S_{iB}$ relative to $S_{iA}$, said selected Update records not having any redundant family keyvalues, for $i=1, 2, \ldots, N$;

executing a Trigger program, including for $i=1, 2, \ldots, N$: stepping through all records of $S_{iB}$, including comparing the family keyvalue $K_{FVR}$ within each record of $S_{iB}$ against the family keyvalues in the dataset $D_{UP}$ and saving in a file $\Delta S_i$ each said record of $S_{iB}$ for which $K_{FVR}$ equals one of the family keyvalues $K_{FV}$ in the dataset $D_{UP}$;

executing a Bridge program, including generating files $\Delta T_1, \Delta T_2, \ldots, \Delta T_M$ that includes the data in $\Delta S_1, \Delta S_2, \ldots, \Delta S_N$ in a form that is compatible with the M tables $T_1, T_2, \ldots, T_M$, respectively;

executing a Sourcegen macroprogram, including generating at least one Sourceload program at a source code level;

compiling the at least one Sourceload program into a corresponding at least one Objectload program in object code form; and executing the at least Objectload program, including updating the tables $T_1, T_2, \ldots, T_M$ with the data in $\Delta T_1, \Delta T_2, \ldots, \Delta T_M$, respectively.

36. The method of claim 35, wherein for $m=1, 2, \ldots, M$: generating the Sourceload program includes utilizing control parameters, said control parameters comprising at least one of: an identification of $\Delta T_m$, a data format description of $\Delta T_m$, an identification of $T_m$, and a data format description of $T_m$.

37. The method of claim 36, said control parameters further including a tweak flag.

38. The method of claim 35, wherein the Bridge program is linked to the Trigger program by a data communications network.

39. A method for updating records in a tableset T of a family, in relation to

N source files denoted as $S_1, S_2, \ldots, S_N$, said N at least 1, said tableset T having M tables $T_1, T_2, \ldots, T_M$, said M at least 1, said N source files logically associated with said M tables, said family having a common family key $K_F$ across the M tables and across the N source files, a fileset $S_A$ comprising files $S_{1A}, S_{2A}, \ldots, S_{NA}$ respectively embodying $S_1, S_2, \ldots, S_N$ at a time $t_A$ such that $T_1, T_2, \ldots, T_M$ at the time $t_A$ accurately reflects $S_A$, and a fileset $S_B$ comprising files $S_{1B}, S_{2B}, \ldots, S_{NB}$ respectively embodying $S_1, S_2, \ldots, S_N$ at a time $t_B$, said $t_B$ and $t_A$ being different times, the method comprises:
executing a Delta program, including generating a dataset $D_{UP}$ of non-redundant family keyvalues embodying $K_F$, each said non-redundant family keyvalue drawn from selected Update records of $S_{iB}$ relative to $S_{iA}$, said selected Update records not having any redundant family keyvalues, for $i=1, 2, \ldots, N$;

executing a Trigger program, including for $i=1, 2, \ldots, N$: stepping through all records of $S_{iB}$, including comparing the family keyvalue $K_{FVR}$ within each record of $S_{iB}$ against the family keyvalues in the dataset $D_{UP}$ and saving in a file $\Delta S_i$ each said record of $S_{iB}$ for which $K_{FVR}$ equals one of the family keyvalues $K_{FV}$ in the dataset $D_{UP}$;

executing a Bridge program, including generating files $\Delta T_1, \Delta T_2, \ldots, \Delta T_M$ that includes the data in $\Delta S_1, \Delta S_2, \ldots, \Delta S_N$ in a form that is compatible with the M tables $T_1, T_2, \ldots, T_M$, respectively;

executing a Sourcegen macroprogram, including generating at least one Sourceload program at a source code level;

compiling the at least one Sourceload program into a corresponding at least one Objectload program in object code form; and executing the at least Objectload program, including updating the tables $T_1, T_2, \ldots, T_M$ with the data in $\Delta T_1, \Delta T_2, \ldots, \Delta T_M$, respectively, such that a read lockout does not occur while $T_1, T_2, \ldots, T_M$ are being updated, said $T_1, T_2, \ldots, T_M$ stored in a database of a database management system (DBMS) having the read lockout for a data transaction on any table $T_A$ in the DBMS if said data transaction on $T_A$ is executed through a transaction statement of the DBMS.

40. The method of claim 39, wherein the Bridge program is linked to the Trigger program by a data communications network.

41. A system for deleting deletion-targeted records in a tableset T of a family, in relation to N source files denoted as $S_1, S_2, \ldots, S_N$, said N at least 1, said tableset T having M tables $T_1, T_2, \ldots, T_M$, said M at least 1, said N source files logically associated with said M tables, said family having a common family key $K_F$ across the M tables and across the N source files, a fileset $S_A$ comprising files $S_{1A}, S_{2A}, \ldots, S_{NA}$ respectively embodying $S_1, S_2, \ldots, S_N$ at a time $t_A$ such that $T_1, T_2, \ldots, T_M$ at the time $t_A$ accurately reflects $S_A$, and a fileset $S_B$ comprising files $S_{1B}, S_{2B}, \ldots, S_{NB}$ respectively embodying $S_1, S_2, \ldots, S_N$ at a time $t_B$, said $t_B$ and $t_A$ being different times, the system comprises:

a Delta program adapted to generate a dataset $D_{DEL}$ of non-redundant family keyvalues embodying $K_F$, each said non-redundant family keyvalue drawn from selected Delete records of $S_{iB}$ relative to $S_{iA}$, said selected Delete records not having any redundant family keyvalues, for $i=1, 2, \ldots, N$; and at least one Load program adapted to delete the deletion-targeted records in the tables $T_1, T_2, \ldots, T_M$, each said deletion-targeted record having one of the non-redundant family keyvalues that exists in the dataset $D_{DEL}$.

42. The system of claim 41, said Delta program adapted to generate the dataset $D_{DEL}$ comprising:

to generate an array A of candidate family keyvalues drawn from all Delete records of $S_{iB}$ relative to $S_{iA}$ for $i=1, 2, \ldots, N$; and to form $D_{DEL}$ by having in $D_{DEL}$ only those candidate family keyvalues from the array A that are non-redundant.

43. The system of claim 41, said Delta program adapted to generate the dataset $D_{DEL}$ comprising:

to generate an array A of candidate family keyvalues drawn from all Delete records of $S_{iB}$ relative to $S_{iA}$ for $i=1, 2, \ldots, N$;

to sort the candidate family keyvalues in the array A; and to form $D_{DEL}$ by having in $D_{DEL}$ only those candidate family keyvalues of the array A that are non-redundant.

44. The system of claim 41, wherein the Delta program is linked to the Load program by a data communications network.

45. The system of claim 41, wherein the at least one Load program comprises at least one Objectload program.

46. The system of claim 45, further comprising a Sourcegen macroprogram adapted to generate at least one Sourceload program at a source code level, said at least one Sourceload program adapted to being compiled into the corresponding at least one Objectload program in object code form.

47. The system of claim 46, wherein that at least one Objectload program is adapted to delete the deletion-targeted records in the tables $T_1, T_2, \ldots, T_M$, such that a read lockout does not occur while the deletion-targeted records in $T_1, T_2, \ldots, T_M$ are being deleted, said $T_1, T_2, \ldots, T_M$ stored in a database of a database management system (DBMS) having the read lockout for a data transaction on any table $T_A$ in the DBMS if said data transaction on $T_A$ is executed through a transaction statement of the DBMS.

48. A method for deleting deletion-targeted records in a tableset T of a family, in relation to N source files denoted as $S_1, S_2, \ldots, S_N$, said N at least 1, said tableset T having M tables $T_1, T_2, \ldots, T_M$, said M at least 1, said N source files logically associated with said M tables, said family having a common family key $K_F$ across the M tables and across the N source files, a fileset $S_A$ comprising files $S_{1A}, S_{2A}, \ldots, S_{NA}$ respectively embodying $S_1, S_2, \ldots, S_N$ at a time $t_A$ such that $T_1, T_2, \ldots, T_M$ at the time $t_A$ accurately reflects $S_A$, and a fileset $S_B$ comprising files $S_{1B}, S_{2B}, \ldots, S_{NB}$ respectively embodying $S_1, S_2, \ldots, S_N$ at a time $t_B$, said $t_B$ and $t_A$ being different times, the method comprises:

executing a Delta program, including generating a dataset $D_{DEL}$ of non-redundant family keyvalues embodying $K_F$, each said non-redundant family keyvalue drawn from selected Delete records of $S_{iB}$ relative to $S_{iA}$, said selected Delete records not having any redundant family a keyvalues, for $i=1, 2, \ldots, N$; and executing at least one Load program, including deleting the deletion-targeted records in the tables $T_1, T_2, \ldots, T_M$, each said deletion-targeted record having one of the non-redundant family keyvalues that exists in the dataset $D_{DEL}$.

49. The method of claim 48, said executing the Delta program and generating the dataset $D_{DEL}$ comprising:

generating an array A of candidate family keyvalues drawn from all Delete records of $S_{iB}$ relative to $S_{iA}$ for $i=1, 2, \ldots, N$; and forming $D_{DEL}$ by having in $D_{DEL}$ only those candidate family keyvalues from the array A that are non-redundant.

50. The method of claim 48, said executing the Delta program and generating the dataset $D_{DEL}$ comprising:

generating an array A of candidate family keyvalues drawn from all Delete records of $S_{iB}$ relative to $S_{iA}$ for $i=1, 2, \ldots, N$;

sorting the candidate family keyvalues in the array A; and forming $D_{DEL}$ by having in $D_{DEL}$ only those candidate family keyvalues of the array A that are non-redundant.

51. The method of claim 48, wherein the Delta program is linked to the Load program by a data communications network.

52. The method of claim 48, wherein executing at least one Load program comprises executing at least one Objectload program.

53. The method of claim 52, further comprising:

executing a Sourcegen macroprogram, including generating at least one Sourceload program at a source code level; and compiling the at least one Sourceload program into the corresponding at least one Objectload program in object code form.

54. The method of claim 53, wherein executing the at least one Objectload program includes having a read lockout not occur while the deletion-targeted records of $T_1, T_2, \ldots, T_M$ are being deleted, said $T_1, T_2, \ldots, T_M$ stored in a database of a database management system (DBMS) having the read lockout for a data transaction on any table $T_A$ in the DBMS if said data transaction on $T_A$ is executed through a transaction statement of the DBMS.

55. A computer program product, comprising at least one computer usable medium having computer readable program codes embodied therein for updating records in a tableset T of a family, in relation to N source files denoted as $S_1, S_2, \ldots, S_N$, said N at least 1, said tableset T having M tables $T_1, T_2, \ldots, T_M$, said M at least 1, said N source files logically associated with said M tables, said family having a common family key $K_F$ across the M tables and across the N source files, a fileset $S_A$ comprising files $S_{1A}, S_{2A}, \ldots, S_{NA}$ respectively embodying $S_1, S_2, \ldots, S_N$ at a time $t_A$ such that $T_1, T_2, \ldots, T_M$ at the time $t_A$ accurately reflects $S_A$, and a fileset $S_B$ comprising files $S_{1B}, S_{2B}, \ldots, S_{NB}$ respectively embodying $S_1, S_2, \ldots, S_N$ at a time $t_B$, said $t_B$ and $t_A$ being different times, said computer readable program codes comprising:

a Delta program adapted to generate a dataset D of non-redundant family keyvalues embodying $K_F$, each said non-redundant family keyvalue drawn from selected Update records of $S_{iB}$ relative to $S_{iA}$, said selected Update records not having any redundant family keyvalues, for $i=1, 2, \ldots, N$;

a Trigger program adapted, for $i=1, 2, \ldots, N$: to step through all records of $S_{iB}$, including to compare the family keyvalue $K_{FVR}$ within each record of $S_{iB}$ against the family keyvalues in the dataset D and to save in a file $\Delta S_i$ each said record of $S_{iB}$ for which $K_{FVR}$ equals one of the family keyvalues $K_{FV}$ in the dataset D;

a Bridge program adapted to generate files $\Delta T_1, \Delta T_2, \ldots, \Delta T_M$ that includes the data in $\Delta S_1, \Delta S_2, \ldots, \Delta S_N$ in a form that is compatible with the M tables $T_1, T_2, \ldots, T_M$, respectively; and at least one Load program adapted to update the tables $T_1, T_2, \ldots, T_M$ with the data in $\Delta T_1, \Delta T_2, \ldots, \Delta T_M$, respectively.

56. A computer program product, comprising at least one computer usable medium having computer readable program codes embodied therein for updating records in a tableset T of a family, in relation to N source files denoted as $S_1, S_2, \ldots, S_N$, said N at least 1, said tableset T having M tables $T_1, T_2, \ldots, T_M$, said M at least 1, said N source files logically associated with said M tables, said family having a common family key $K_F$ across the M tables and across the N source files, a fileset $S_A$ comprising files $S_{1A}, S_{2A}, \ldots, S_{NA}$ respectively embodying $S_1, S_2, \ldots, S_N$ at a time $t_A$ such that $T_1, T_2, \ldots, T_M$ at the time $t_A$ accurately reflects $S_A$, and a fileset $S_B$ comprising files $S_{1B}, S_{2B}, \ldots, S_{NB}$ respectively embodying $S_1, S_2, \ldots, S_N$ at a time $t_B$, said $t_B$ and $t_A$ being different times, said computer readable program codes comprising:

a Delta program adapted to generate a dataset D of non-redundant family keyvalues embodying $K_F$, each said non-redundant family keyvalue drawn from selected Update records of $S_{iB}$ relative to $S_{iA}$, said selected Update records not having any redundant family keyvalues, for $i=1, 2, \ldots, N$;

a Trigger program adapted, for $i=1, 2, \ldots, N$: to step through all records of $S_{iB}$, including to compare the family keyvalue $K_{FVR}$ within each record of $S_{iB}$ against the family keyvalues in the dataset D and to save in a file $\Delta S_i$ each said record of $S_{iB}$ for which $K_{FVR}$ equals one of the family keyvalues $K_{FV}$ in the dataset D;

a Bridge program adapted to generate files $\Delta T_1, \Delta T_2, \ldots, \Delta T_M$ that includes the data in $\Delta S_1, \Delta S_2, \ldots, \Delta S_N$ in a form that is compatible with the M tables $T_1, T_2, \ldots, T_M$, respectively; and at least one Objectload program in object code form adapted to update the tables $T_1, T_2, \ldots, T_M$ with the data in $\Delta T_1, \Delta T_2, \ldots, \Delta T_M$, respectively.

57. A computer program product, comprising at least one computer usable medium having computer readable program codes embodied therein for updating records in a tableset T of a family, in relation to N source files denoted as $S_1, S_2, \ldots, S_N$, said N at least 1, said tableset T having M tables $T_1, T_2, \ldots, T_M$, said M at least 1, said N source files logically associated with said M tables, said family having a common family key $K_F$ across the M tables and across the N source files, a fileset $S_A$ comprising files $S_{1A}, S_{2A}, \ldots, S_{NA}$ respectively embodying $S_1, S_2, \ldots, S_N$ at a time $t_A$ such that $T_1, T_2, \ldots, T_M$ at the time $t_A$ accurately reflects $S_A$, and a fileset $S_B$ comprising files $S_{1B}, S_{2B}, \ldots, S_{NB}$ respectively embodying $S_1, S_2, \ldots, S_N$ at a time $t_B$, said $t_B$ and $t_A$ being different times, said computer readable program codes comprising:

a Delta program adapted to generate a dataset D of non-redundant family keyvalues embodying $K_F$, each said non-redundant family keyvalue drawn from selected Update records of $S_{iB}$ relative to $S_{iA}$, said selected Update records not having any redundant family keyvalues, for $i=1, 2, \ldots, N$;

a Trigger program adapted, for $i=1, 2, \ldots, N$: to step through all records of $S_{iB}$, including to compare the family keyvalue $K_{FVR}$ within each record of $S_{iB}$ against the family keyvalues in the dataset D and to save in a file $\Delta S_i$ each said record of $S_{iB}$ for which $K_{FVR}$ equals one of the family keyvalues $K_{FV}$ in the dataset D;

a Bridge program adapted to generate files $\Delta T_1, \Delta T_2, \ldots, \Delta T_M$ that includes the data in $\Delta S_1, \Delta S_2, \ldots, \Delta S_N$ in a form that is compatible with the M tables $T_1, T_2, \ldots, T_M$, respectively; and a Sourcegen macroprogram adapted to generate at least one Sourceload program at a source code level, said at least one Sourceload program adapted to being compiled into at least one Objectload program in object code form, said at least one Objectload program adapted to update the tables $T_1, T_2, \ldots, T_M$ with the data in $\Delta T_1, \Delta T_2, \ldots, \Delta T_M$, respectively.

58. A computer program product, comprising at least one computer usable medium having computer readable program codes embodied therein for updating records in a tableset T of a family, in relation to N source files denoted as $S_1, S_2, \ldots, S_N$, said N at least 1, said tableset T having M tables $T_1, T_2, \ldots, T_M$, said M at least 1, said N source files logically associated with said M tables, said family having a common family key $K_F$ across the M tables and across the N source files, a fileset $S_A$ comprising files $S_{1A}, S_{2A}, \ldots, S_{NA}$ respectively embodying $S_1, S_2, \ldots, S_N$ at a time $t_A$ such that $T_1, T_2, \ldots, T_M$ at the time $t_A$ accurately reflects $S_A$, and a fileset $S_B$ comprising files $S_{1B}, S_{2B}, \ldots, S_{NB}$ respectively embodying $S_1, S_2, \ldots, S_N$ at a time $t_B$, said $t_B$ and $t_A$ being different times, said computer readable program codes comprising:

a Delta program adapted to generate a dataset D of non-redundant family keyvalues embodying $K_F$, each said non-redundant family keyvalue drawn from selected Update records of $S_{iB}$ relative to $S_{iA}$, said selected Update records not having any redundant family keyvalues, for i=1, 2, ..., N;

a Trigger program adapted, for i=1, 2, ..., N: to step through all records of $S_{iB}$, including to compare the family keyvalue $K_{FVR}$ within each record of $S_{iB}$ against the family keyvalues in the dataset D and to save in a file $\Delta S_i$ each said record of $S_{iB}$ for which $K_{FVR}$ equals one of the family keyvalues $K_{FV}$ in the dataset D;

a Bridge program adapted to generate files $\Delta T_1, \Delta T_2, \ldots, \Delta T_M$ that includes the data in $\Delta S_1, \Delta S_2, \ldots, \Delta S_N$ in a form that is compatible with the M tables $T_1, T_2, \ldots, T_M$, respectively; and a Sourcegen macroprogram adapted to generate at least one Sourceload program at a source code level, said at least one Sourceload program adapted to being compiled into at least one Objectload program in object code form, said at least one Objectload program adapted to update the tables $T_1, T_2, \ldots, T_M$ with the data in $\Delta T_1, \Delta T_2, \ldots, \Delta T_M$, respectively, such that a universal locking does not occur while $T_1, T_2, \ldots, T_M$ are being updated, said $T_1, T_2, \ldots, T_M$ stored in a database of a database management system (DBMS) having the universal locking for a data transaction on any table $T_A$ in the DBMS if said data transaction on $T_A$ is executed through a transaction statement of the DBMS.

59. A computer program product, comprising at least one computer usable medium having computer readable program codes embodied therein for deleting deletion-targeted records in a tableset T of a family, in relation to N source files denoted as $S_1, S_2, \ldots, S_N$, said N at least 1, said tableset T having M tables $T_1, T_2, \ldots, T_M$, said M at least 1, said N source files logically associated with said M tables, said family having a common family key $K_F$ across the M tables and across the N source files, a fileset $S_A$ comprising files $S_{1A}, S_{2A}, \ldots, S_{NA}$ respectively embodying $S_1, S_2, \ldots, S_N$ at a time $t_A$ such that $T_1, T_2, \ldots, T_M$ at the time $t_A$ accurately reflects $S_A$, and a fileset $S_B$ comprising files $S_{1B}, S_{2B}, \ldots, S_{NB}$ respectively embodying $S_1, S_2, \ldots, S_N$ at a time $t_B$, said $t_B$ and $t_A$ being different times, said computer readable program codes comprising:

a Delta program adapted to generate a dataset $D_{DEL}$ of non-redundant family keyvalues embodying $K_F$, each said non-redundant family keyvalue drawn from selected Update records of $S_{iB}$ relative to $S_{iA}$, said selected Update records not having any redundant family keyvalues, for i=1, 2, ..., N; and at least one Load program adapted to delete the deletion-targeted records in the tables $T_1, T_2, \ldots, T_M$, each said deletion-targeted record having one of the non-redundant family keyvalues that exists in the dataset $D_{DEL}$.

60. The computer program product of claim 59, wherein the at least one Load program comprises at least one Objectload program.

61. The computer program product of claim 60, said computer readable program codes further comprising a Sourcegen macroprogram adapted to generate at least one Sourceload program at a source code level, said at least one Sourceload program adapted to being compiled into the corresponding at least one Objectload program in object code form.

62. The computer program product of claim 61, wherein that at least one Objectload program is adapted to delete the deletion-targeted records in the tables $T_1, T_2, \ldots, T_M$, such that a read lockout does not occur while the deletion-targeted records in $T_1, T_2, \ldots, T_M$ are being deleted, said $T_1, T_2, \ldots, T_M$ stored in a database of a database management system (DBMS) having the read lockout for a data transaction on any table $T_A$ in the DBMS if said data transaction on $T_A$ is executed through a transaction statement of the DBMS.

* * * * *